US006598952B2

(12) United States Patent
Ishinaga et al.

(10) Patent No.: US 6,598,952 B2
(45) Date of Patent: Jul. 29, 2003

(54) LIQUID JET RECORDING HEAD HAVING CONTROLLER FOR CONTROLLING TEMPERATURE DISTRIBUTION

(75) Inventors: Hiroyuki Ishinaga, Tokyo (JP); Masami Ikeda, Tokyo (JP); Ryoichi Koizumi, Yokohama (JP); Asao Saito, Yokohama (JP); Kenjiro Watanabe, Tokyo (JP); Tsutomu Abe, Isehara (JP); Nobuyuki Kuwabara, Tokyo (JP); Tsuguhiro Fukuda, Yokohama (JP); Tsutomu Katoh, Kawasaki (JP); Toshihiro Mori, Kawasaki (JP); Seiichiro Karita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/749,735

(22) Filed: Dec. 28, 2000

(65) Prior Publication Data

US 2001/0004263 A1 Jun. 21, 2001

Related U.S. Application Data

(62) Division of application No. 08/245,232, filed on May 17, 1994, now Pat. No. 6,234,599, which is a continuation of application No. 07/949,069, filed on Sep. 22, 1992, now abandoned, which is a division of application No. 07/803,906, filed on Dec. 9, 1991, now Pat. No. 5,175,565, which is a continuation of application No. 07/566,885, filed on Aug. 13, 1990, now abandoned, which is a continuation of application No. 07/383,098, filed on Jul. 21, 1989, now abandoned.

(30) Foreign Application Priority Data

| | | |
|---|---|---|
| Jul. 26, 1988 | (JP) | 63-184685 |
| Jul. 26, 1988 | (JP) | 63-184686 |
| Jul. 26, 1988 | (JP) | 63-184699 |
| Aug. 5, 1988 | (JP) | 63-194481 |
| Nov. 22, 1988 | (JP) | 63-293630 |
| Nov. 24, 1988 | (JP) | 63-294621 |
| Nov. 24, 1988 | (JP) | 63-294622 |
| Dec. 23, 1988 | (JP) | 63-323683 |
| Jul. 19, 1989 | (JP) | 64-184416 |

(51) Int. Cl.$^{7}$ .......... G01D 15/16
(52) U.S. Cl. .......... 347/14; 347/17; 347/67
(58) Field of Search .......... 347/56, 67, 57, 347/58, 59, 60, 14, 17, 194; 374/178; 257/467

(56) References Cited

U.S. PATENT DOCUMENTS

| | | | | |
|---|---|---|---|---|
| 4,791,435 A | * | 12/1988 | Smith et al. | 346/139 R |
| 4,910,528 A | * | 3/1990 | Firl et al. | 347/17 |
| 5,107,276 A | * | 4/1992 | Kneezel et al. | 347/14 |
| 5,175,565 A | * | 12/1992 | Ishinaga et al. | 347/17 |
| 5,760,797 A | | 6/1998 | Koizumi et al. | 347/14 |
| 6,139,125 A | | 10/2000 | Otsuka et al. | 347/11 |
| 6,234,599 B1 | * | 5/2001 | Ishinaga et al. | 347/14 |

FOREIGN PATENT DOCUMENTS

| | | |
|---|---|---|
| JP | 58-118267 | 7/1983 |
| JP | 58-220772 | 12/1983 |

(List continued on next page.)

*Primary Examiner*—Robert Beatty
(74) *Attorney, Agent, or Firm*—Fitzpatrick, Cella, Harper & Scinto

(57) ABSTRACT

A recording apparatus uses a liquid recording head for effecting recording by ejecting liquid through ejection outlets corresponding to heat generation elements provided in the recording head. The recording head has a heating device for heating the recording head. A controller will select a heat generating element from among the heat generating elements to correct a temperature distribution of the recording head resulting from the heating by the heating device such that the heat generating element generates heat to such an extent that liquid for recording is not ejected through the ejection outlet during the temperature correction.

18 Claims, 31 Drawing Sheets

FOREIGN PATENT DOCUMENTS

| | | | | | |
|---|---|---|---|---|---|
| JP | 59-56046 | | | 4/1984 | |
| JP | 60002370 | A | * | 1/1985 | ........... B41J/03/04 |
| JP | 60-139068 | | | 7/1985 | |
| JP | 61-139458 | | | 6/1986 | |
| JP | 61-206658 | | | 9/1986 | |
| JP | 62-19461 | | | 1/1987 | |
| JP | 62039261 | A | * | 2/1987 | ........... B41J/03/20 |
| JP | 62-158075 | | | 7/1987 | |
| JP | 62-193835 | | | 8/1987 | |
| JP | 62-170239 | | | 10/1987 | |
| JP | 63-41161 | | | 2/1988 | |
| JP | 63-47159 | | | 2/1988 | |
| JP | 63-114670 | | | 5/1988 | |
| JP | 63-134252 | | | 6/1989 | |

* cited by examiner

LIQUID JET RECORDING HEAD HAVING CONTROLLER FOR CONTROLLING TEMPERATURE DISTRIBUTION

This application is a divisional of application Ser. No. 08/245,232, filed May 17, 1994 and issued as U.S. Pat. No. 6,234,599 on May 22, 2001, which is a continuation of application Ser. No. 07/949,069, filed on Sep. 22, 1992, now abandoned, which is a divisional of application Ser. No. 07/803,906, filed on Dec. 9, 1991 and issued as U.S. Pat. No. 5,175,565 on Dec. 29, 1992, which is a continuation of application Ser. No. 07/566,885, filed on Aug. 13, 1990, now abandoned, which is a continuation of application Ser. No. 07/383,098, filed on Jul. 21, 1989, now abandoned.

FIELD OF THE INVENTION AND RELATED ART

The present invention relates to a liquid jet recording substrate, a liquid jet recording head using the substrate and a recording apparatus using the recording head, more particularly to the substrate, head and apparatus wherein an electrothermal transducer for producing thermal energy is used to produce the energy for ejecting recording liquid.

The recording system in which the liquid is ejected using the thermal energy is particularly noted in recent years, which is disclosed in U.S. Pat. Nos. 4,723,129 and 4,740,796. The recording system is advantageous, inter alia, in its quick response to the recording electric signal and in its small size due to high density arrangement of the ejecting elements.

A further development of this recording system is disclosed in U.S. Pat. No. 4,719,472 in which the liquid is pre-heated to a predetermined temperature to improve the recording. To accomplish this, the liquid reservoir is provided with a temperature sensor and a heater. The purpose is to regulate the viscosity of the liquid.

As another development, U.S. Pat. No. 4,550,327 discloses a recording head wherein plural thermal energy generating elements are arranged in a predetermined direction and wherein a sensor is provided to discriminate presence and absence of the liquid in each of the liquid passages having the thermal energy generating elements. The purpose is not concerned with the thermal problem, but is known as the system including plural elements and plural sensors. However, this suppresses more or less the advantage of the recording system (small size) due to the necessity of enlarging the liquid passage width.

Accordingly, a recording system wherein the advantage of the small size with high density is maintained, and the state of the recording substrate or the recording head is quickly detected or discriminated, is highly desired.

In the liquid jet recording substrate provided with plural thermal energy producing elements, non-uniform temperature distribution or localized high temperature portion may occur. However, this has not been taken account, and therefore, occurrences of ejection failure leads to abnormal temperature rise with the possible result of physical deformation of the structure around the substrate, made of organic material.

In the conventional systems, the temperature sensor and the heater are separately mounted with the result of increased manufacturing steps and cost. In addition, the temperature control in the conventional system is possible with a certain accuracy as long as the overall temperature of the whole recording head. However, the number of experiments and investigations carried out by the inventors have revealed that after continued recording operations, a temperature gradient is produced in the substrate, so that the quality of the recorded image is degraded. It has been difficult in the conventional system to continue good recording when the temperature gradient is produced.

SUMMARY OF THE INVENTION

Accordingly, it is a principal object of the present invention to provide a liquid jet recording substrate, a recording head and apparatus using the same wherein temperature detection is performed with high accuracy and with good response.

It is another object of the present invention to provide a low cost liquid jet recording substrate and the liquid jet recording head and apparatus using the same wherein the problem arising from the temperature gradient produced in the substrate are solved and wherein the temperature detection and temperature control can be performed with high accuracy and with quick response.

It is as yet further object of the present invention to provide a liquid jet recording substrate, and a liquid jet recording head and apparatus wherein a temperature detecting element and a temperature keeping heating element are produced on the substrate through the same film deposition process which is used in the production of an ejection energy producing elements (electrothermal transducers), so that the manufacturing cost is reduced, that they can be closely disposed and that the temperature control can be performed with high accuracy and with quick response.

According to various aspects of the present invention:

(1) A substrate for liquid ejection, comprising: a built-in energy generating element for generating thermal energy; a built-in electrode wiring portion for supplying an electric signal to said energy generating element; and a built-in temperature detecting element for detecting a temperature of said substrate:

(2) A substrate as defined in Paragraph (1), wherein said temperature detecting element is made, at least partly, of a material substantially the same as a material at least partly forming said energy generating element or said electrode wiring portion:

(3) A substrate as defined in Paragraph (1) or (2), wherein said substrate includes a region wherein a plurality of such energy generating elements are disposed in the form of an array, and wherein said temperature detecting element is disposed adjacent each longitudinal end of the array:

(4) A substrate as defined in Paragraph (3), further comprising a heater for heating said substrate provided adjacent said each end, and wherein temperature control is effected using a combination of said temperature detecting element and said substrate heating heater adjacent one of the ends, and using a combination of said temperature detecting element and said substrate heating heater adjacent the other end:

(5) A substrate as defined in Paragraph (4), further comprising a built-in common electric line electrically connected to said temperature detecting element and to said substrate heating heater:

(6) A substrate as defined in Paragraph (1), wherein said temperature detecting element is in the form of a diode temperature sensor comprising plural diodes connected in series, each of which is of substantially the same structure as a switching diode contained in said wiring portion:

(7) A substrate as defined in Paragraph (3), wherein at least a part of each of said temperature sensing element is on an extension of the array:

(8) A substrate as defined in Paragraph (7), wherein said substrate includes a region wherein a plurality of switching element are disposed for selectively driving the plural energy generating elements, a region wherein matrix wiring is disposed between said energy generating element disposed area and said switching element disposed area, and substrate heating heaters disposed adjacent each of end portions of said matrix wiring portion:

(9) A substrate as defined in Paragraph (8), wherein said temperature detecting element is formed using a silicon base member, and said substrate further comprising two electrically insulative layers, wherein said substrate heating heater is formed between extensions of respective electrically insulating layers:

(10) A liquid jet recording head comprising the substrate defined in Paragraph (9) comprising: a common ink chamber for accommodating ink, formed on said substrate, ink passages, corresponding to the respective energy generating elements, for maintaining the ink supplied from said common chamber and ejection outlets through which the ink is ejected for recording; wherein an upper portion at least one of said temperature detecting elements and said substrate heating heaters is outside said common ink chamber and outside an ink maintaining region of said ink passages:

(11) A recording head as defined in Paragrah (10), wherein a part of said matrix wiring portion is disposed on a lower one of said electrically insulating layers adjacent said substrate heating heaters:

(12) An ink jet recording apparatus, to which the recording head as defined in Paragraph (10) is detachably mountable, comprising electrical connection and temperature control means for effecting temperature control using a combination of said temperature detecting element and said substrate heating heater adjacent one of the ends, and for effecting a temperature control using a combination of said temperature detecting element and said substrate heating heater at the other end:

(13) An ink jet recording apparatus to which the recording head as defined in Paragraph (9) is detachably mountable, wherein said common ink chamber has an ink containing portion extending to a neighborhood of boundary between said matrix wiring region and said switching element disposed region and before said switching element disposed region:

(14) An ink jet recording apparatus usable with a recording head containing the substrate as defined in Paragraph (1), comprising recovery means for improving ink ejecting function of the recording head and control means for operating said recovery means in accordance with an output of said temperature detecting element:

(15) A recording head, comprising: a substrate including a built-in energy generating element for generating thermal energy for liquid ejection and electrode wiring portion for supplying an electric signal to said energy generating element; a function element associated with a temperature of said substrate, wherein said function element is also a built-in element of said substrate; a common chamber for containing ink on said substrate, an ink passage for maintaining the ink supplied from said common chamber and corresponding to said energy generating element, and an ink ejection outlet through which the ink is ejected for recording; wherein an upper portion of said function element is outside the common chamber and outside an ink maintaining portion of said passage:

(16) A recording head as defined in Paragraph (15), wherein said function element is made, at least partly, of a material which is substantially the same as a material constituting at least partly said energy generating element or said electrode wiring portion:

(17) A liquid jet recording apparatus, comprising: a plurality of heat generating elements for producing thermal energy to eject recording liquid; heating means provided in a recording head to heat said recording head; and control means for selectively actuating said heat generating elements to produce such heat as not to eject the liquid, so as to control a temperature distribution of the recording head: AND

(18) A liquid jet recording apparatus, comprising: a plurality of heat generating elements for producing thermal energy to eject recording liquid; and means for selectively actuating said heat generating elements to produce such heat as not to eject the liquid, so as to control a temperature distribution in the head, and for heating the recording head when a main switch of said apparatus is closed and/or when a recording starting signal is produced:

are provided.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 3 shows a circuit for detecting temperature rise attributable to ejection failure or the like.

FIG. 4 is a graph of temperature vs. time illustrating temperature rise caused by the ejection failure or the like.

DETAILED DESCRIPTION OF THE PREFERRED EMBODIMENTS

Figure 1A:
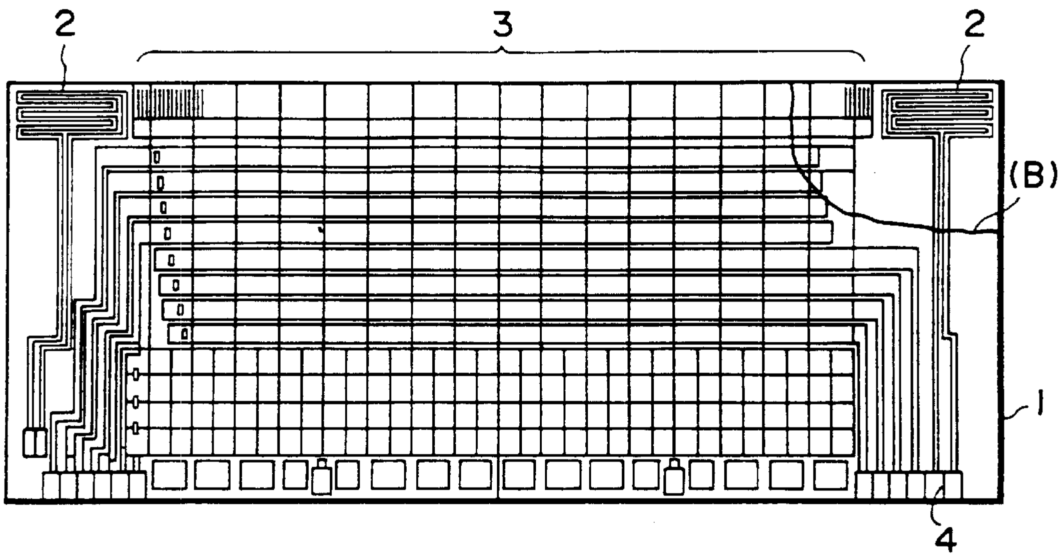
FIG. 1A is a plan view of a substrate (heater board) applicable to a liquid jet recording head according to an embodiment of the present invention.
Figure 1B:
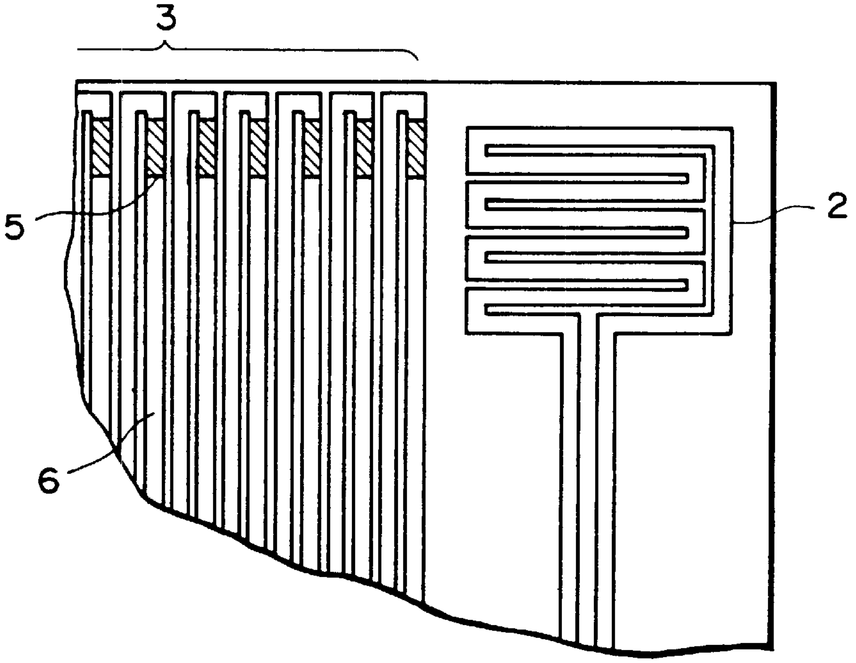
FIG. 1B is an enlarged view of a part of FIG. 1A.

Referring to FIGS. 1A and 1B, there is shown a substrate (base member) according to an embodiment of the present invention. The substrate is usable in the structure of FIGS. 2 and 26 which will be described in detail hereinafter. As shown in FIGS. 1A and 1B, the substrate has an ejection heater portion or region 3 in which a number of thermal energy producing elements (electrothermal transducers are disposed). The general structure of the recording head will be more understandable if the reference is made to FIG. 17 wherein the liquid ejecting passages are established by bonding the top board 110 to the substrate 102 by which ejection passages having ejection outlet 103 are formed, and the liquid or ink in the passage is heated by the heater 106 in accordance with actuation signal to eject the ink to a sheet disposed faced to the outlets.

Referring back to FIGS. 1A and 1B, temperature sensors 2 are disposed such that at least parts thereof are adjacent to longitudinal ends of the region 3. The sensors 2 are, as contrasted to the conventional sensors, built-in sensors. The substrate 1 has ejection heaters 3 and contacts 4 connectable with external electric wiring by wire bonding technique or the like. The temperature sensor 2 is formed adjacent to the ejection heater portion 3 by the same film deposition process that is used when the ejection heater portion 3 is formed. FIG. 1B is an enlarged view of a portion B containing the sensor 2, in which designated by reference numerals 5 and 6 are ejection heaters and wiring therefor.

Since the sensors 2 are formed by the same film deposition process as in the production of the ejection heaters and wiring and as a film deposition process employed in a semiconductor device manufacturing, they are very accurately formed. They can be made of aluminum, titanium, tantalum or the like having an electrical conductivity variable with temperature, which is used for the other part of the substrate.

For example, those materials are used in the substrate at the following parts. Aluminum can be used as electrodes; titanium can be used between the electrothermal transducer element (heat generating resistor layer) and an electrode therefor for enhancing bonding property therebetween; and tantalum can be used to cover the heat generating resistance layer as a protection layer against cavitation.

The sensor 2 shown has a meander structure to provide a high resistance as a whole without adverse influence to the wiring on the substrate. The output of the sensor 2 can be picked up from the contacts 4.

Figure 2:
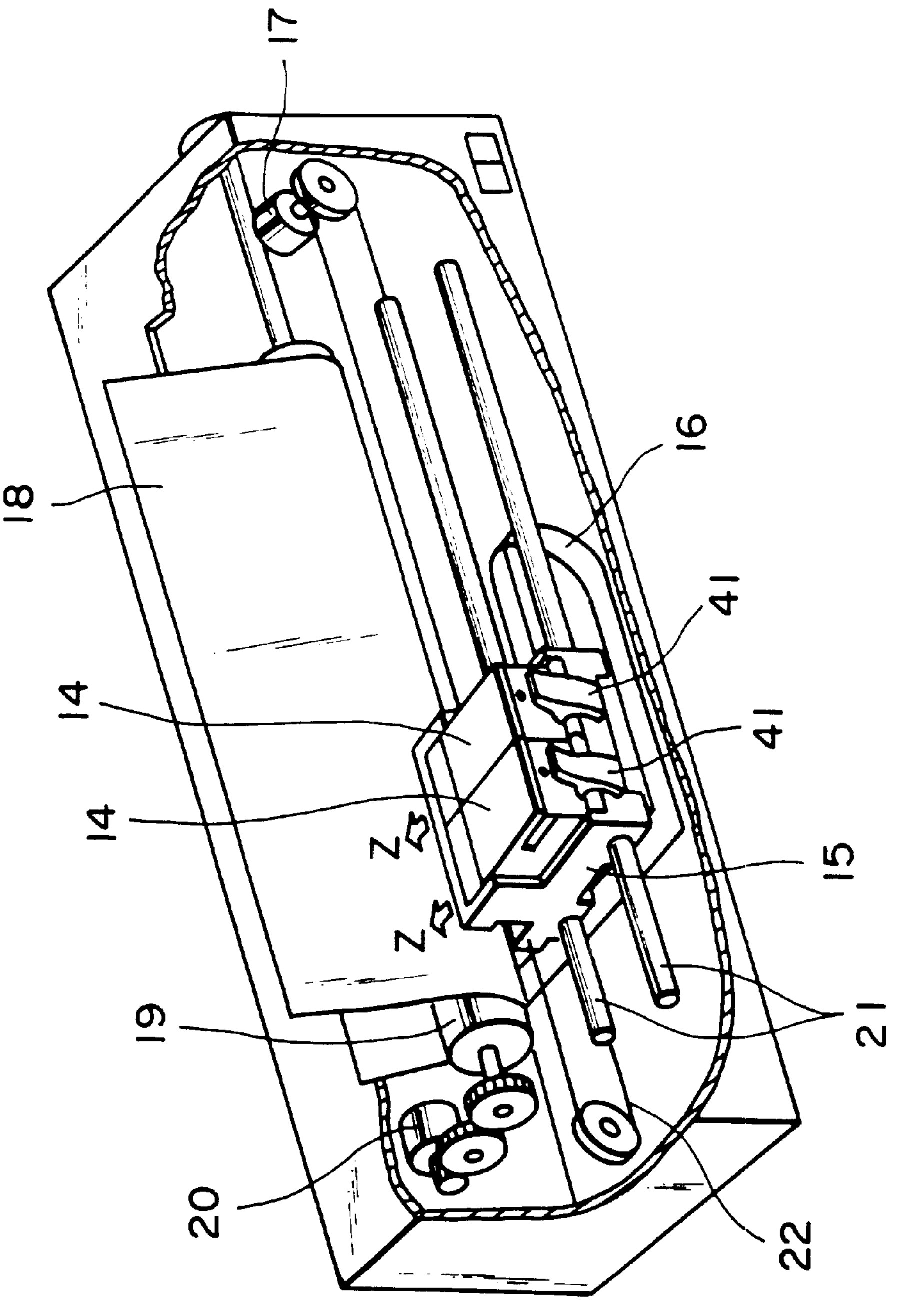
FIG. 2 is a perspective view of a liquid jet recording apparatus using the present invention.

The substrate having this structure can be used to constitute a recording head, and a liquid jet recording apparatus (ink jet recording apparatus) can be constructed using the recording head, as shown schematically in FIG. 2 in a perspective view.

In FIG. 2, a head cartridge 14 includes a recording head constructed using the substrate 1 described above and an ink container as a unit, detachably mountable to the carriage 15 of the recording apparatus. The head cartridge 14 is detachably fixed on the carriage 15 by a confining member 41. The carriage 15 is reciprocable along the length of the shaft 21, by which the head cartridge 14 also reciprocates. The ink ejected by the recording head reaches a recording medium 18 supported on a platen 19 with a small clearance from the recording head, thus producing an image on the recording medium 18.

To the recording head, ejection signals are applied, corresponding to the data representative of the image to be recorded from a data source through proper cables 16 and contact 4 (FIG. 1A) connected thereto. One or more (two, in the FIG. 2) head cartridges 3*b* may be used to meet the colors in which the images are to be recorded.

In FIG. 2, there are shown a carriage motor 17 for scanning reciprocating motion of the carriage 15 along the shaft 21, a wire 22 for transmitting driving force from the motor 17 to the carriage 15 and a feed motor 20 connected to the platen roller 19 to feed the recording medium 18.

Figure 3:
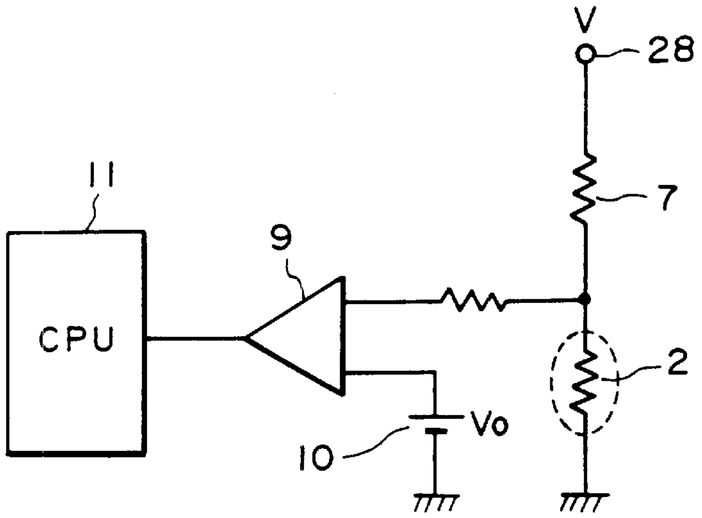

FIG. 3 shows an example of a temperature detecting circuit using the output of the sensor 2 shown in FIGS. 1A and 1B. The detector may be mounted on a control board of the apparatus and may be connected with cable 16 to the contacts 4.

As shown in this Figure, the sensor 2 is connected to a voltage divider resistor 7 and a high voltage contact 28 so that the resistance change of the sensor 2 is converted to a voltage change. The voltage output is compared with a reference voltage provided by the voltage source 10 by a comparator 9, and is supplied to a CPU (central processing unit) 11, not shown in FIG. 2, which constitutes a main portion of the device of FIG. 2. The CPU 11 discriminates whether the substrate temperature is higher or lower than a predetermined temperature.

Figure 4:
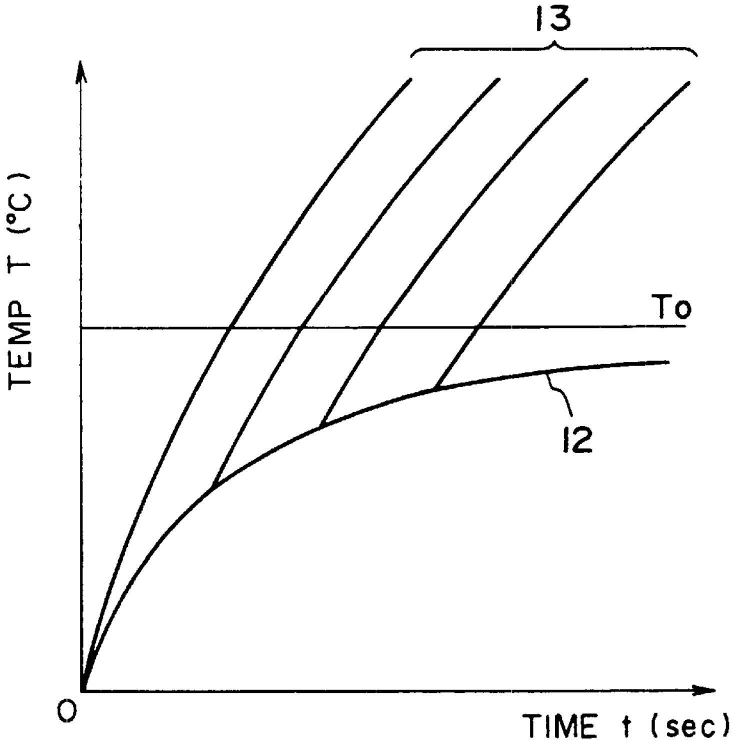

FIG. 4 shows possible temperature changes detected by the temperature sensors of the substrate 1. When the ink is ejected in proper conditions, the temperature rises along the curve 12 to reach a saturated temperature. If, however, ejection failure occurs due to clogging or the like, the heat is accumulated with the result of steep increase of the temperature, as shown by curves 13.

Different curves 13 show the temperature change when the ejection failures occur at different times. The leftmost curve 13 indicates that the ejection failure occurs from the beginning, whereas the rightmost curve 13 indicates that the ejection failure occurs when the temperature of the recording head substrate reaches the saturated temperature.

The reference voltage V0 of the comparator 9 is set to correspond to the saturated temperature. Then, when the temperature of the substrate 1 exceeds the level T0, the event is informed of the CPU 11, upon which the CPU 11 discriminates the occurrence of the ejection failure. On the basis of the discrimination, the ejecting operation is interrupted, an alarm is produced, and further a recovery operation using a cap or the like is started. The reference temperature T0 is so selected that it is not reached during normal or proper ink ejecting operation, and it is lower than a temperature damaging the head.

As described above, according to this embodiment, the temperature sensor is built-in the substrate, and is made of the same material as the electrode which is a part of the electrothermal transducer. The electric resistance of the sensor changes linearly with respect to the temperature change so that correct temperature sensing operation is possible. This is particularly so, when aluminum is used as the temperature sensing element.

Second Embodiment

Figure 5:
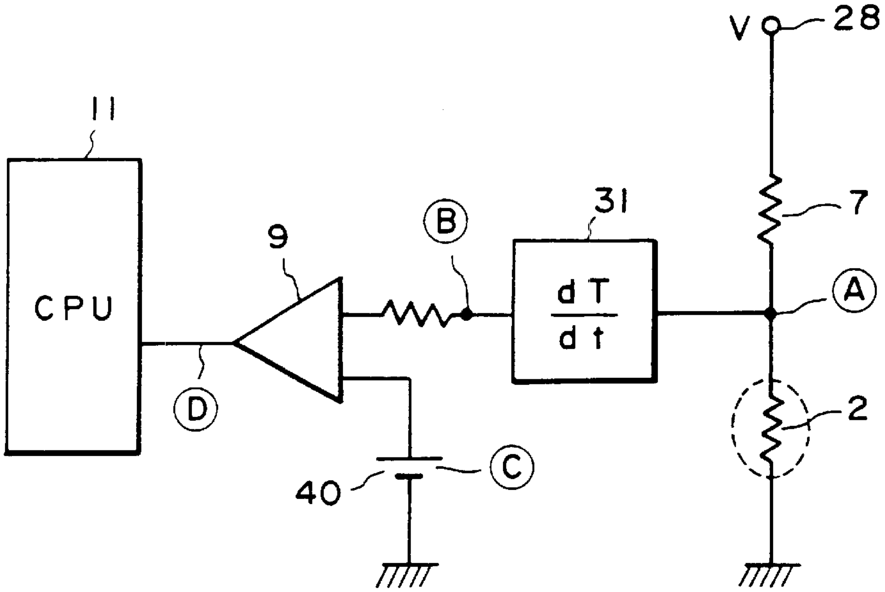
FIG. 5 shows another example of the circuit for detecting the temperature rise.
Figure 6:
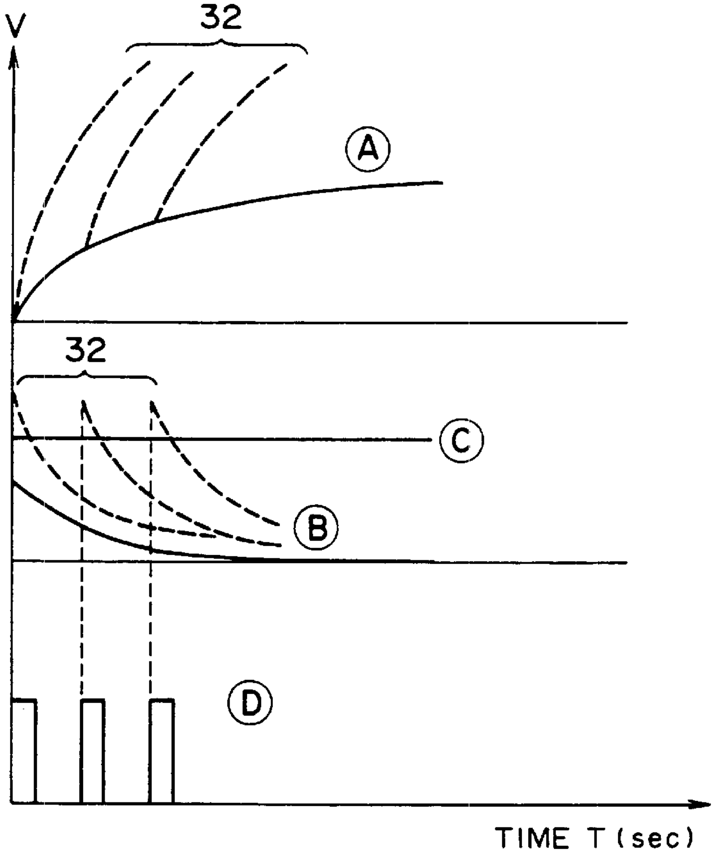
FIG. 6 is a graph of temperature vs. time illustrating an operation of the circuit of FIG. 5.

Referring to FIG. 5 showing the second embodiment, a differentiator 31 is provided before the comparator 9 of the circuit shown in FIG. 3 so as to permit monitoring the changing rate of the temperature detected by the temperature sensor 2. FIG. 6 shows an output waveform of the portions A, B, C and D of FIG. 5.

The output A of the temperature sensor suddenly changes as soon as the ejection failure occurs. The rate of the change appears as the voltage level of the output B of the differentiator 31. By comparison of it with the output C of the reference voltage 10, the ejection failure signal is transmitted to the CPU 11. The CPU 11 is capable of instructing the above-described proper actions in response to the reception of the failure signal.

In this embodiment, the temperature change is monitored, and therefore, the ejection failure can be detected immediately without delay necessitated to wait for the temperature to reach a predetermined high temperature. In addition, the adverse affect by the ambient temperature is reduced, thus effectively protecting the recording head.

Third Embodiment

Figure 7:
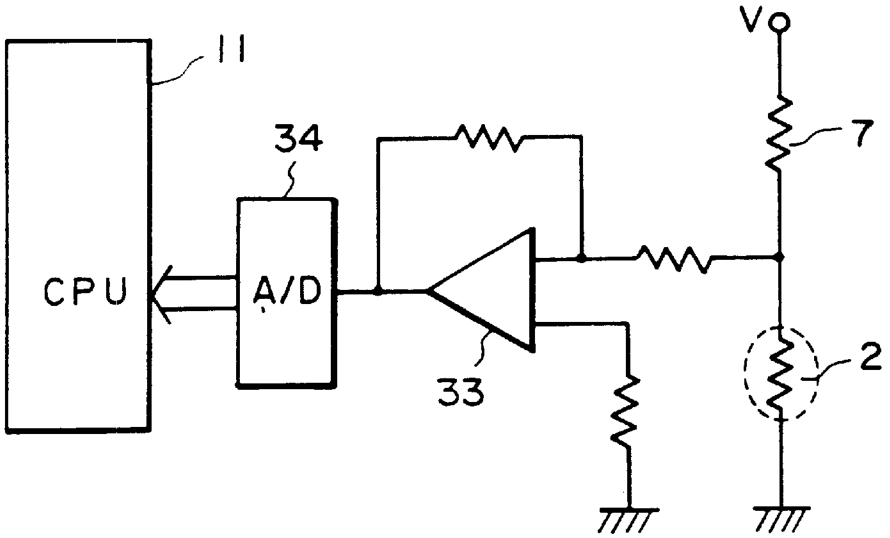
FIG. 7 shows a further example of the temperature rise detecting circuit.
Figure 8:
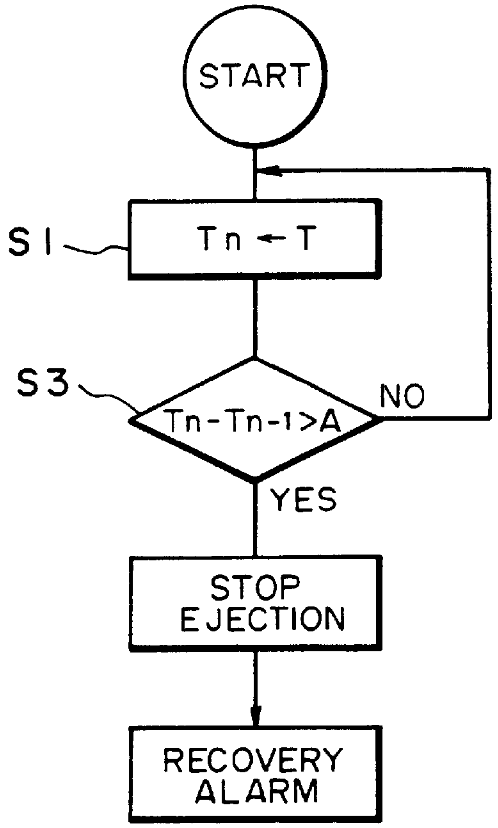
FIG. 8 is a flow chart illustrating the steps for discriminating erroneous operation in response to the temperature rise detection.

Referring to FIG. 7, the third embodiment is shown, wherein the changing rate of the substrate 1 temperature is detected by software using the CPU 11. The output of the temperature sensor 2 is amplified by an operational amplifier 33 and is supplied to an A/D converter 34 where a digitalized temperature level is inputted into the CPU 11. The CPU 11 executes its discrimination sequence shown in FIG. 8 as an example. The CPU calculates a difference between the temperature Tn read at this time (Step S1) and the temperature Tn−1 read at the previous time, that is, a predetermined period before; and on the basis of the difference the ejection failure is discriminated (Step S3).

More particularly, the discrimination is made as to whether the temperature difference (Tn−Tn−1) is larger than a predetermined level A or not. If so, the ejection failure is discriminated to immediately interrupt the ejection operation (Step S5), and instructs the recovery operation and alarm as the case may be (Step S7).

As compared with the first embodiment, this embodiment is disadvantageous in the time delay resulting from the temperature at different times being compared, but it is advantageous in that the reference temperature A can be determined as desired. Therefore, even if the ejection duty is low, and therefore, the temperature change is small, the detection can be made correspondingly to the ejection duty. In other words, the control is flexible to meet various operational conditions of the recording head.

As described in the foregoing, according to this embodiment, the temperature detecting sensor is directly built in the substrate, and therefore, the temperature difference between the actual temperature of the substrate and the detected temperature is small, and the detection delay is also small. Accordingly, the causes of the temperature rise such as the ejection failure or the like can be correctly and quickly discriminated, thus preventing damage of the recording head.

The temperature sensor can be made of the material used for producing the other part of the substrate, and therefore, it can be formed only by adding the sensor pattern. Thus, the manufacturing cost can be remarkably reduced. The sensor 2 may be in the form of a diode or transistor or the like if it can be produced by the film deposition process of the substrate.

Figure 9A:
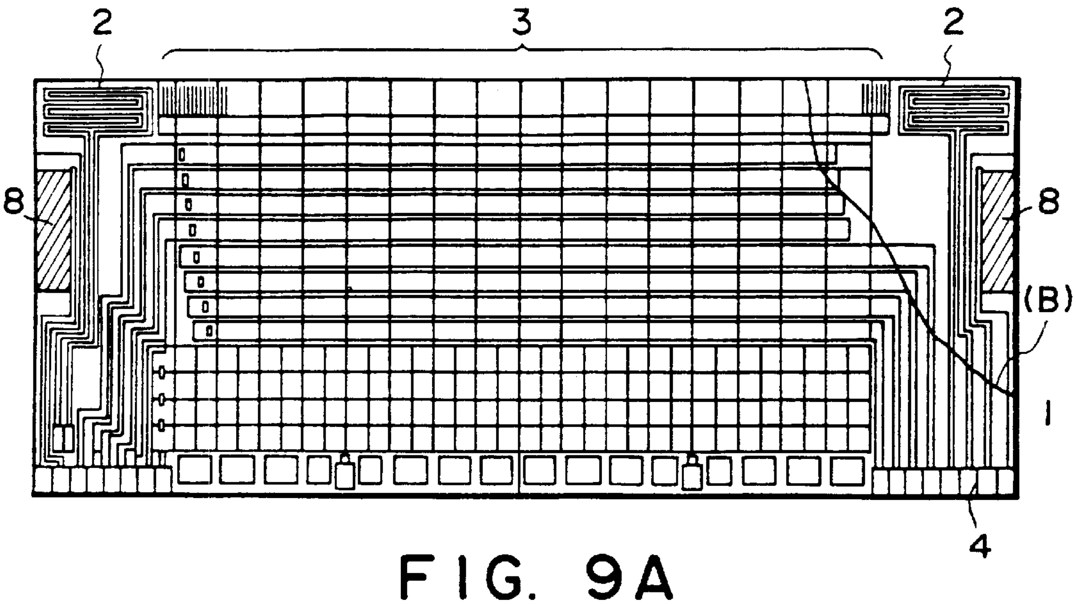
FIG. 9A is a plan view of the substrate (heater board) usable with a liquid jet recording head according to another embodiment of the present invention.
Figure 9B:
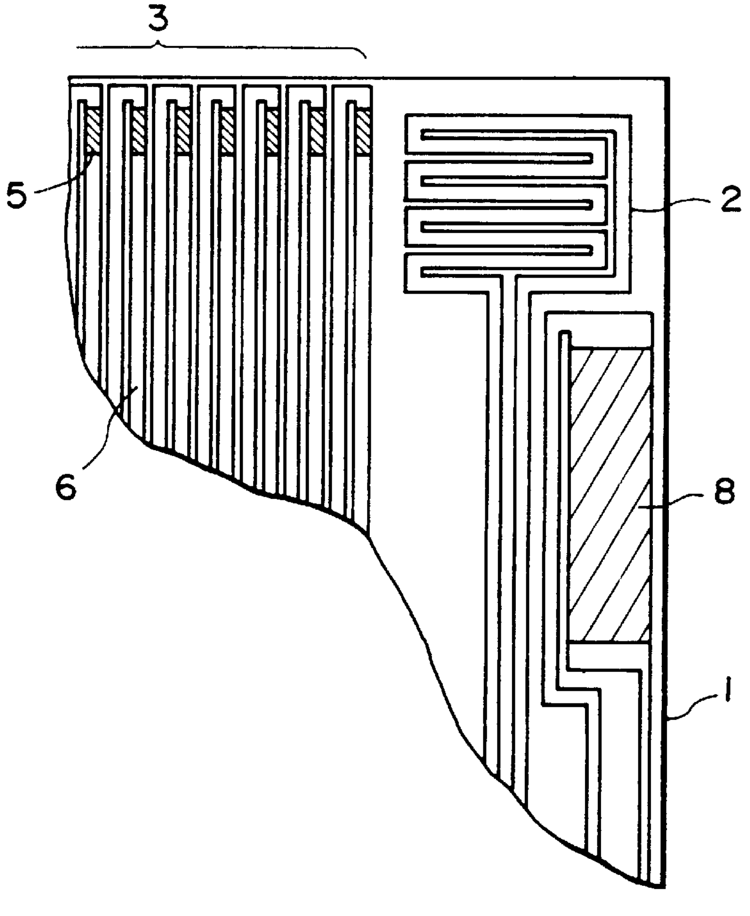
FIG. 9B is an enlarged view of FIG. 9A.

Referring to FIGS. 9A, 9B, 10, 11A, 11B, 11C, 12 and 13, a further embodiment will be described wherein the temperature distribution of the substrate is controlled using the temperature sensors. As shown in FIGS. 9A and 9B, a temperature keeping heater 8 for heating the entire recording head or the substrate 1 is added to the structure shown in FIGS. 1A and 1B.

The material constituting the temperature keeping heater 8 according to this embodiment may be the same as the heat generating resistor layer ($HfB_2$, for example) of the ejection heater 5 or another material constituting various elements or wiring on the substrate, for example, aluminum, tantalum, titanium or the like. By the use of one or more of those materials, the temperature keeping heater can be produced by the same process employed when the various elements and wiring or the like is formed on the substrate, and therefore, the manufacturing cost is not increased.

The recording head may be constructed using the substrate 1 of this embodiment, and the liquid jet recording apparatus (ink jet recording apparatus) as shown in FIG. 2 can be constructed using such a recording head.

The basic structures of the recording head and the recording apparatus are the same as with the first embodiment, and therefore, the detailed description is omitted for simplicity.

Figure 10:
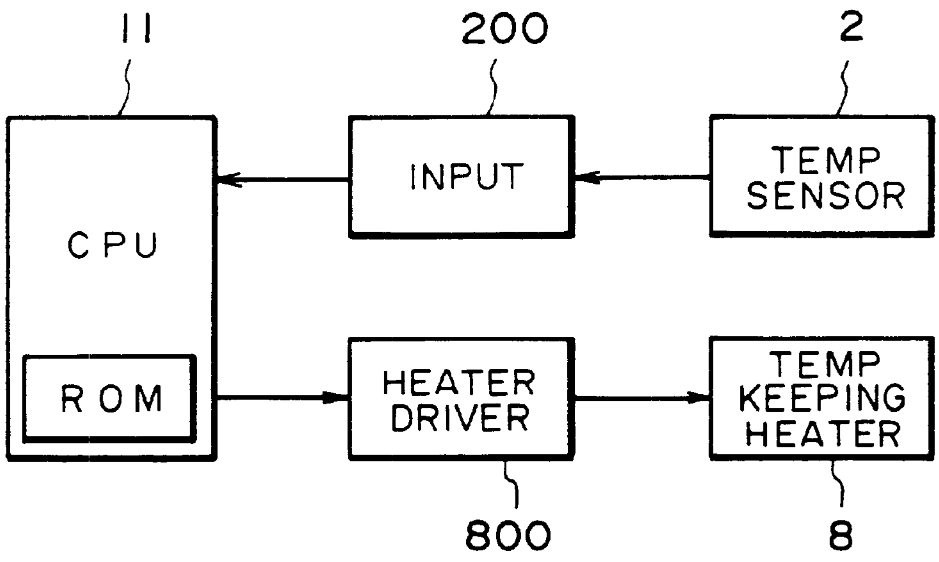
FIG. 10 is a block diagram illustrating a control system.

FIG. 10 shows an example of the temperature control system using the sensor 2 and the temperature keeping heater 8 shown in FIGS. 9A and 9B. The control system may be mounted on the control board or the like and may be connected to the sensor 2 and the heater 8 by the contacts 4 through an unshown cable.

A microcomputer CPU 11 functions to execute the process steps which will be described hereinafter in conjunction with FIG. 12. The CPU includes ROM storing fixed data such as the program for executing the process steps. The CPU 11 can be independently provided to execute the temperature control of this embodiment, or it may be used commonly with the main control system of the apparatus of FIG. 2.

An input portion 200 serves to supply energy to the temperature sensor 2 and to convert the output thereof to a signal receptable by the CPU 11 and further to supply the signal to the CPU 11. A heater driver 800 functions to supply energy to the temperature keeping heater 8.

Figure 11A:
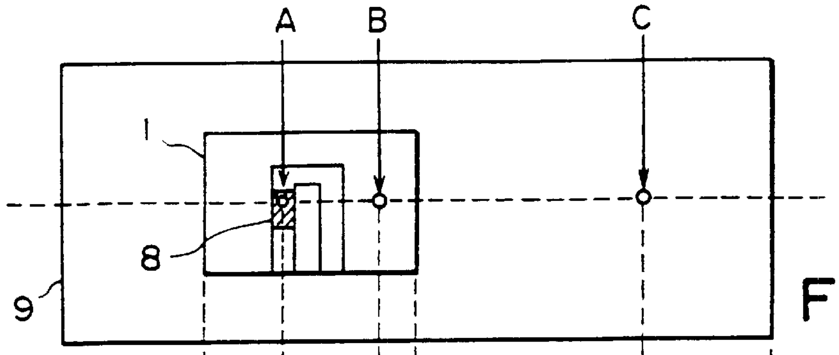
FIGS. 11A, 11B and 11C illustrate temperatures of various positions of the recording head.
Figure 11B:
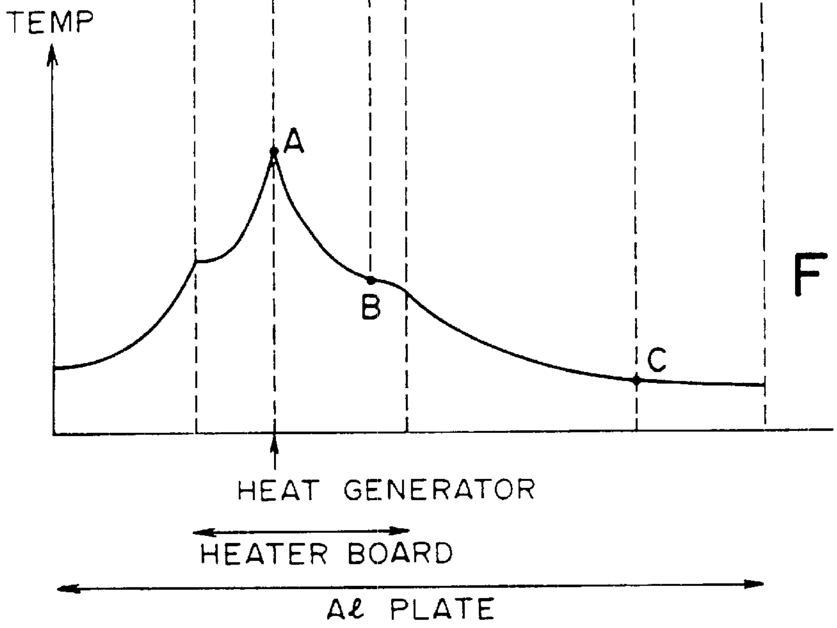
Figure 11C:
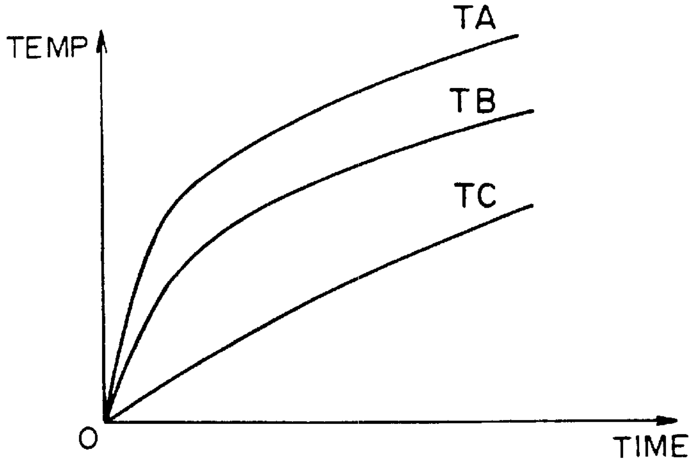
Figure 13:
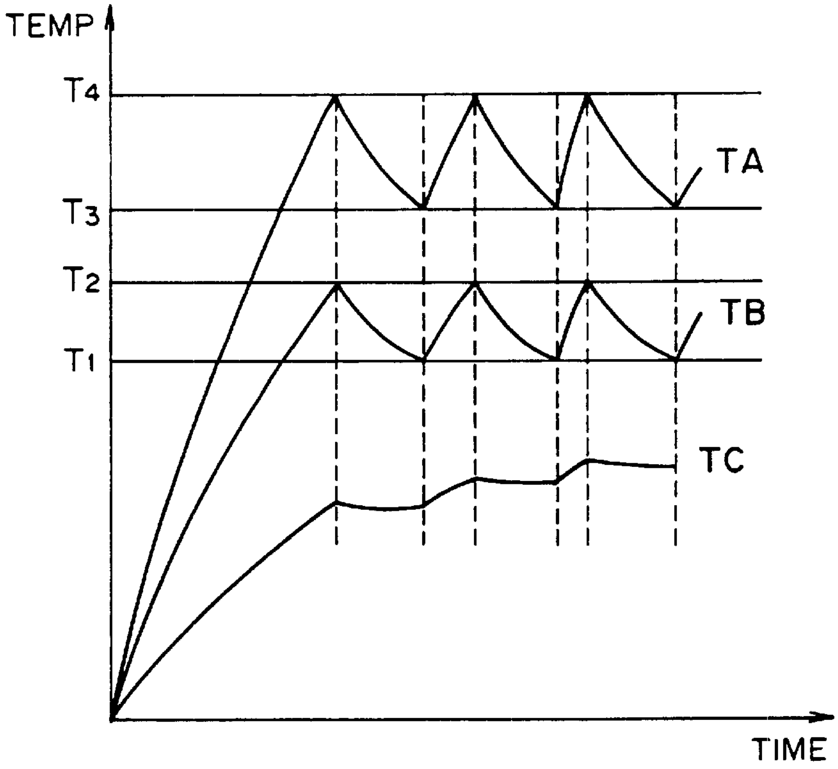
FIG. 13 is a graph of temperature vs. time for illustrating operation.

Referring to FIG. 11, the description will be made as to the temperature of the substrate and therearound of the recording head for the better understanding of the present invention. For the purpose of enabling the image recording with high resolution to be accomplished, the substrate 1 of the recording head is provided with a great number of electrothermal transducer elements functioning as the liquid ejecting energy generating elements. In order to radiate the heat, the substrate 1 is closely contacted a base plate 9 made of aluminum or the like having a size larger than the substrate, as shown in FIG. 11A. With this structure, there are temperature differences, as shown in FIG. 13, among the ejecting heaters 5 on the substrate 1, the other portion of the substrate (the sensor 2, for example) and the aluminum plate 9. A temperature $T_A$ at the ejecting heater position A, a temperature $T_B$ at the other portion and a temperature $T_C$ on the aluminum plate are such that the temperatures $T_B$ and $T_C$ are quite lower than the temperature $T_A$, as shown in FIG. 11B. In addition, the difference is different depending on the time as shown in FIG. 11C. As will be understood, the temperature curves exhibit that the temperature of the aluminum plate 9 changes with delay in a transient state.

In the conventional head provided with the temperature sensor, a thermister is most frequently used. The thermister is usually mounted on the aluminum plate 9 because it occupies a relatively large space. In this case, as will now be understood from FIG. 11B, the temperature detected is greatly different from the temperature adjacent the ejecting heater 6 which is directly influential to the ejecting property, so that the good detection with high accuracy enough to permit good recording has been difficult.

In this embodiment, the temperature sensor 2 is disposed at a position corresponding to the position B in FIG. 11A, more particularly, the temperature sensors are disposed closely to the opposite longitudinal ends of the array of the ejecting heaters as will be understood from FIG. 9A. This enables very high accuracy detection to be achieved.

Figure 12:
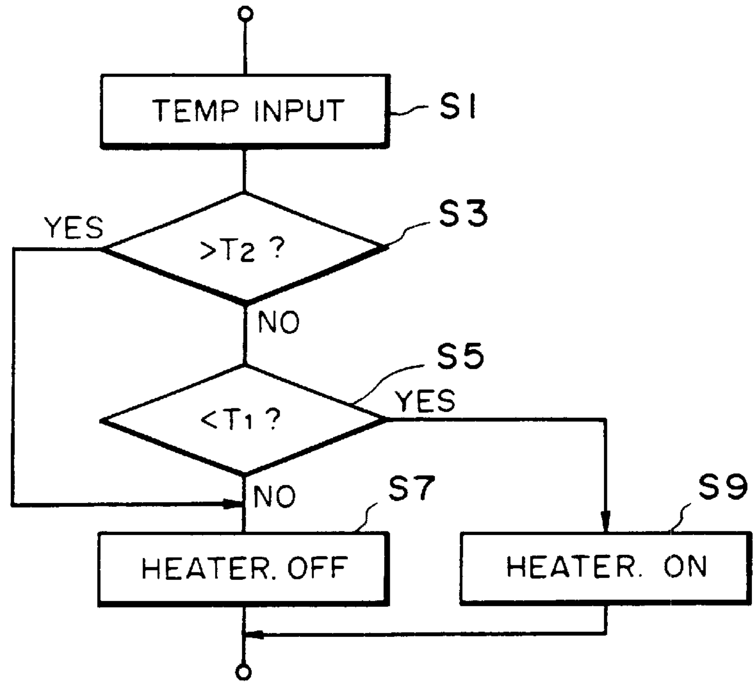
FIG. 12 is a flow chart illustrating an example of the temperature controlling steps.

Referring to FIG. 12, this embodiment will be further described, in which the temperature changes at the positions A, B and C are shown with elapse of time when the temperature is controlled in accordance with the control steps according to this embodiment. By the operation in accordance with the flow chart of FIG. 12, the temperature $T_A$ at the position A where the ejecting heaters are provided is controlled within a range between a temperature $T_3$ and a temperature $T_4$ ($T_3<T_4$). The process shown in FIG. 12 can be started at a desired time. When it is started, the output of the sensor 2 is read at step S1, and the description is made as to whether or not it is higher than a temperature $T_2$ where the temperature $T_2$ is a temperature smaller than the temperature $T_3$. If not, the sequence goes to the step $S_5$ where the discrimination is made as to whether or not the temperature detected by the sensor 2 is lower than a temperature $T_1$, where the temperature $T_1$ is a temperature lower than the temperature $T_2$.

When the result of discrimination at the step S5 is negative or when the discrimination at the step S3 is affirmative, the energization of the heater 8 is stopped at step S7. When the result of discrimination at the step S5 is affirmative, the heater is energized at step S9.

In this manner, the temperature at the position A is controlled within the range between $T_3$–$T_4$. As will be understood, the energization of the temperature keeping heater 8 driven by the heater driver is controlled so that the temperature at the position B detected by the temperature sensor is within the range between $T_1$ and $T_2$ which are lower than the temperature $T_4$.

The characteristic of the liquid ejection in the liquid jet recording system are influenced by the temperature, and therefore, keeping the temperature at the position A constant is preferable to stabilize the ejection characteristics and therefore the quality of the record, the position A corresponding to the position where the thermal energy effective to eject the ink acts on the ink. It will be understood that the temperature change at the position A is limited within the range between the temperatures $T_3$ and $T_4$ if the temperature at the position B is detected by the temperature sensor 2, and the temperature keeping heater 8 is deenergized and energized when the temperature reaches $T_2$ and when the temperature reaches $T_1$, respectively.

According to this embodiment, the temperature keeping heater and the temperature sensor are both on the same substrate, more particularly, they are disposed adjacent to the opposite ends of the array of the ejecting heaters as shown in FIG. 9, the accuracy of the temperature control is significantly improved.

Since there is a close relation in the temperature between the position A and the position B, the system of this embodiment can relatively easily meet the temperature gradient produced in the substrate 1.

As contrasted, the temperature change at the position C shown in FIG. 13 does not responsed quickly, and therefore, it is not proportional as the temperature at the position B.

The description will be made as to the method of manufacturing the recording head according to this embodiment. First, a monocrystal silicon substrate is prepared, and diodes for preventing erroneous operation of the ejecting heaters are formed on the substrate. The surface of the substrate now having the diodes is heat-oxidized to form a silicon oxide layer functioning as a heat accumulation layer and an insulating layer, and contact holes are formed by etching. Then, hafnium boride layer functioning as the heat generating resistance layer is formed by sputtering. Further thereon, an aluminum layer is formed for constituting signal wiring, temperature sensor and temperature keeping heater, and then it is patterned properly. As a result, plural ejecting heaters (electrothermal transducers), signal wiring of aluminum, temperature sensor of aluminum and a heat keeping heater of aluminum, are formed.

Then, a silicon oxide layer is formed on the entire surface by a CVD method, the layer functioning as an insulating protection layer on the elements and wiring described above. Further on that layer, Ta layer functioning as an anti-cavitation layer and a photosensitive resin layer functioning as a protection layer against ink are partly formed.

Finally, a top board having recessed portions to form ink ejection outlets and ink passages is mounted, so that the recording head is manufactured.

As described in the foregoing, according to this embodiment, the temperature detecting sensors and temperature keeping heaters are formed integrally on the substrate at the desired positions, and therefore, the temperature difference and the detection delay are reduced, by which the temperature control is quick and accurate. By this, the non-uniform density in the image and the ink ejection failure attributable to improper temperature control can be eliminated.

Since the materials of the temperature sensor and the temperature keeping heater are the same as one or more of the materials used in the film deposition process of the substrate, they are easily formed by adding the patterns corresponding to those elements. The manufacturing cost is significantly improved. Also, the positions and numbers of those elements can be more freely selected. However, it is preferable that the temperature sensors are positioned as shown in FIGS. 1A and 9A, and that the heaters are disposed outside (remote from the ejecting heaters) of the respective sensors.

Figure 14:
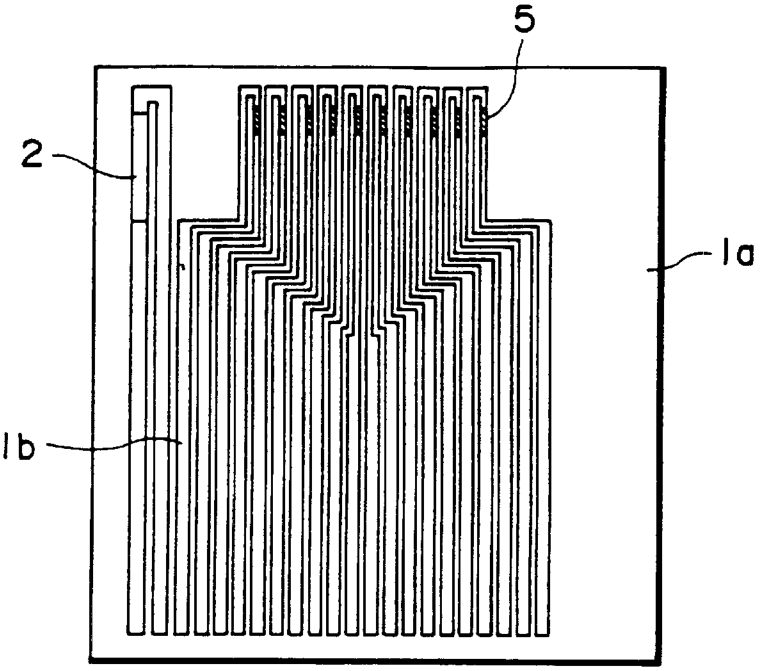
FIG. 14 is a plan view of another temperature sensor, according to the present invention.

In FIG. 14, the heat sensitive element 2, similarly to the heater 5 of the heat generating element, is wired using the electrode 1*d*, and is electrically connected with the printed board 6 by a wire bonding technique or the like. The heat sensitive element 12 can be formed at a correct position, using a photolithography.

In this embodiment, the film deposition process and the film deposition apparatus can be simplified if the material of the heat sensitive element 2 is the same as the heat generating element 5.

In addition, the thermal capacity of the thin-film temperature sensor is extremely small, and therefore, the thermal response is very quick, so that the temperature control of the head can be effected with high accuracy together with the correct positioning of the temperature sensor is by the photolithography.

In the liquid jet recording head described above, the heat sensitive element 2 functioning as the temperature sensor is formed on the substrate 1*a* for the ejecting heater element, that is, on the same substrate as has the heat generating elements 5. Therefore, the temperature measurement can be performed at a position closer to the portion to be measured.

In addition, the temperature sensor is formed by the thin-film technique, the thermal capacity of the sensor itself is extremely small with the result of very quick thermal response.

The electrode 2 and the heat generating element 5 are coated with a protection layer (not shown) for protection from the liquid (which will be described hereinafter) and the material of the protection layer may be oxide such as $SiO_2$, $Ta_2O_5$, $Al_2O_3$, nitride such as $Si_3N_4$ or AlN, carbide such as AiC or carbon in the form of diamond.

The heat sensitive element 2 may be an electric resistor having a function of temperature detection. It preferably exhibits a property of the resistance which significantly reduces with increase of the temperature, using, as the major material thereof, oxide of Ni or Co.

With the increase of the numbers of the ejecting heaters or liquid passages for retaining and supplying liquid thereto per unit area, the size of the wiring lines of the frame is decreased, and a number of the wiring lines is increased. Therefore, the number of frame wiring lines and the number of the pads of the substrate (heater board) is preferably as small as possible. However, when the substrate includes an integral temperature keeping heater and a temperature sensor, the frame wiring and pads therefor are additionally required to be provided.

Referring to FIGS. 15, 16A, 16B, 16C and 16D, there is shown an embodiment wherein the wiring for the temperature keeping heater and the temperature sensor are arranged properly on the heater board in consideration of the above to simplify the wiring on the heater board and the recording head using the same, and to reduce the size thereof.

According to this embodiment, there is provided a liquid jet recording substrate or head comprising an energy generating element for generating energy for ejecting liquid and plural function elements performing functions different from that of the energy generating element, and wherein the energy generating element and the function elements are formed on one and the same substrate, and one-side wiring lines the plural function elements are common on the substrate. According to this structure, the one of the wiring of one of the plural function elements (temperature sensor and the temperature keeping heater, for example) is made common with the other. For example, the grounding wiring is made common, by which the number of electrode contacts for the external correction can be reduced.

Figure 15:
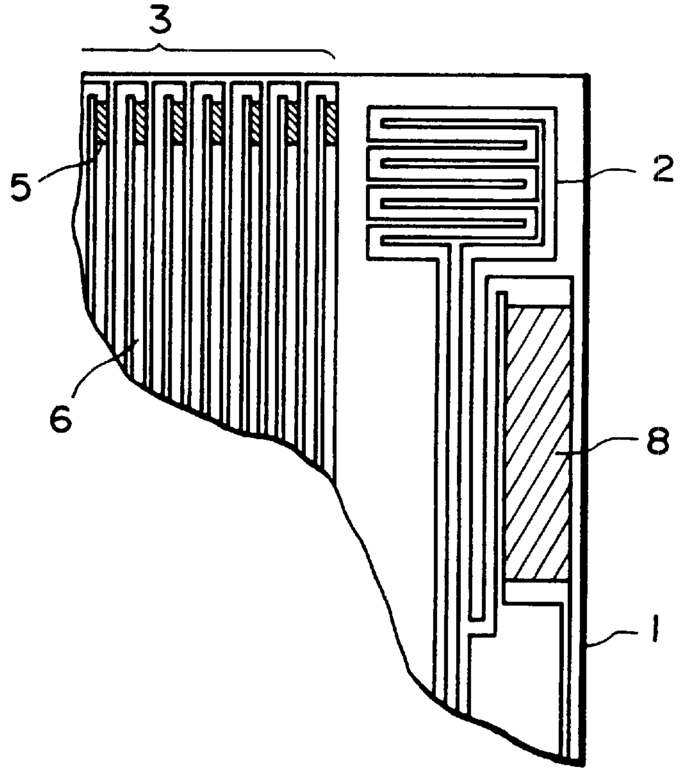
FIGS. 15, 16A, 16B, 16C and 16D are plan views illustrating reduction of the number of pads according to the present invention.
Figure 16A:
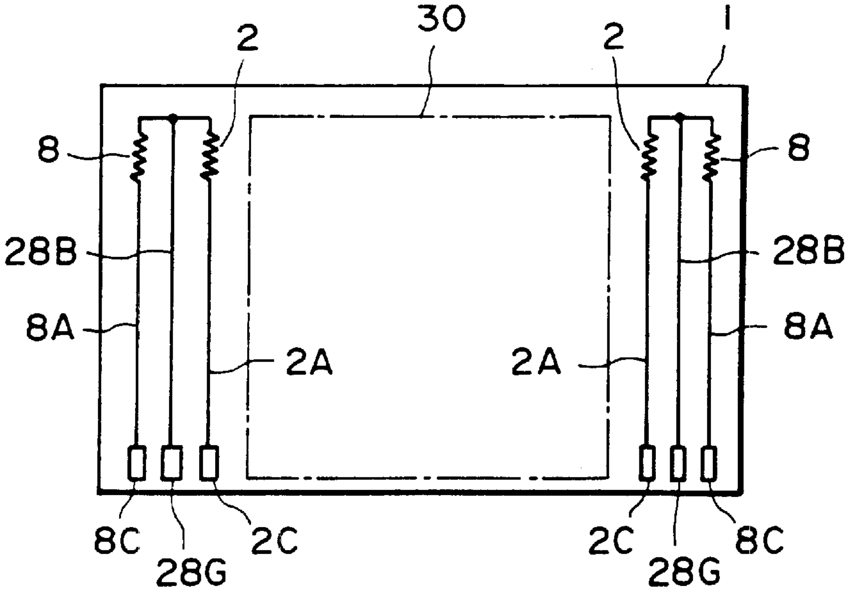

Similarly to FIG. 9B, the temperature keeping heater 8 of FIG. 15 may be made of the same material as the heat generating resistance layer of the ejecting heater 5 ($HfB_2$ for example). However, in FIG. 15, it is made of another material such as aluminum, tantalum or titanium. The electrode wiring at one end is connected as the electrode wiring at an end of the sensor 2. This is shown in FIGS. 16A, 16C and 16D. The arrangement of FIG. 16A will be described in comparison with the arrangement of FIG. 16B particularly in the number of the pads. FIG. 16A shows a major part of the heater board according to an embodiment of the present invention, wherein the grounding wiring printed is common for the temperature sensors 2 at left and right of the ejecting heater portion 3 and for the temperature keeping heater 8.

In this Figure, printed wirings 2A and 8A are to supply energy to the temperature sensor 2 and the temperature keeping heater 8. The pads therefor are depicted by references 2C and 8C. The grounding wiring 28B printed is common. The pads 28G are formed for the grounding wiring. An area designated by a reference numeral 30 contains ejection heaters 3 and the wiring therefor, drivers and electrode pads.

Figure 16B:
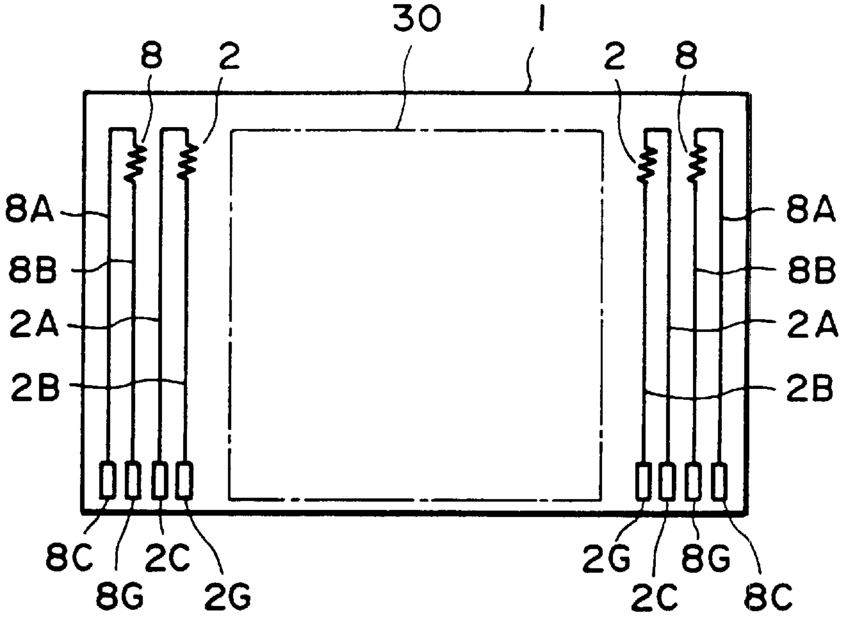
Figure 16C:
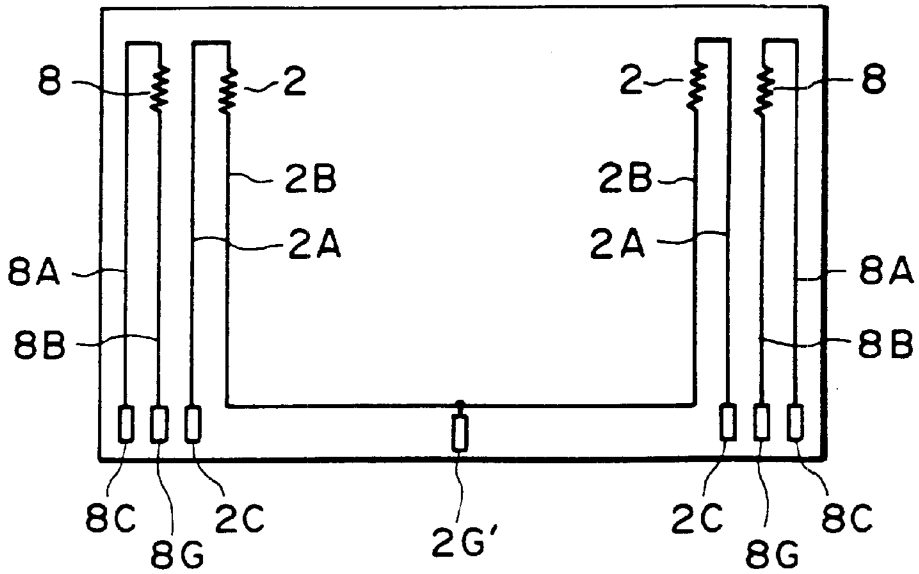
Figure 16D:
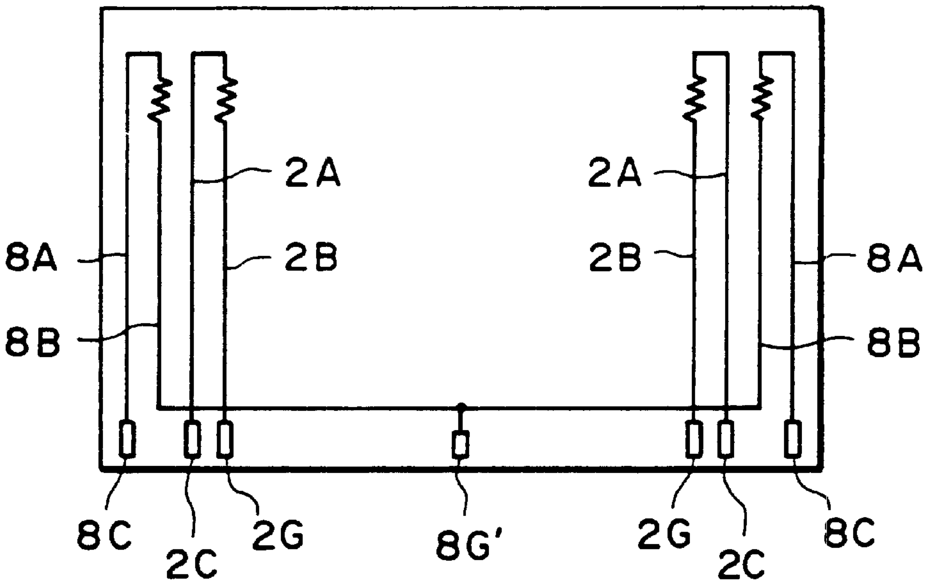

As contrasted to the arrangement of FIG. 16B wherein the grounding wirings 2B and 8B are not common, and the electrode pads 2G and 8G are formed for the respective wirings, the number of pads required for the sensors and the temperature keeping heaters according to this embodiment is reduced by three at one side, and six at both sides. Therefore, the bonding step with the lead frame is simplified, and the size of the heater board 1 is reduced.

When the above structure of this embodiment is used to detect the temperature or to keep the temperature of the heater board 1, they are actuated or energized at different timing, for example, in a time shearing manner.

In this arrangement, the wiring can be further arranged so that the grounding wiring at both sides are common as the single wiring 28G. By doing so, the number of pads can be decreased one more. By suitably selecting the timing, the two sensors and temperature keeping heaters can be driven separately.

In this example, the grounding wiring is made common, but the supplying side can be made common, while the grounding sides are made separate. In this case, switches are provided in the grounding lines to the control system, and the switches are selectively closed and opened to selectively drive or energize the temperature sensors 2 and the temperature keeping heaters 8.

FIGS. 16C and 16D show additional modifications. In FIG. 16C, the grounding wiring 2B printed for the left and right temperature sensors are made common, and a single electrode pad 2G' is provided. In FIG. 16D, the grounding wiring 8G printed for the temperature keeping heaters 8 are made common and a single electrode pad 8G' therefor is formed.

The number of electrode pads can be reduced by one as compared with the structure of FIG. 16B. The left and right temperature sensors 2 and the temperature keeping heaters 8 may be simultaneously driven, or may be separately driven with different timing. In those examples, as described hereinbefore in conjunction with FIG. 16A, the power supply sides are made common, while the grounding sides are made separate. In this case also, switches are provided in the grounding lines to the control system. The switches are properly closed and opened so as to selectively drive or energize the left and light temperature sensors and the temperature keeping heaters.

In a construction of the heater board, the structure of FIG. 16C having a common printed wiring for the left and right temperature sensors 2 at one side and the structure of FIG. 16D having a common printed wiring for the temperature keeping heaters 8 at one side, may be combined. Further, as regards the structure of FIG. 16C, the temperature keeping heaters 8 and the wiring may be formed outside the heater board. As regards the structure of FIG. 16D, the temperature sensors 2 and the wiring therefor may be formed outside the heater board.

The embodiments described in conjunction with FIG. 15–FIG. 16D are applicable if a plural number of function elements having a function or functions different from that the ejecting energy generating element are formed on the same substrate as the ejecting energy generating element. As an example of another function element, there is a Peltier effect element or the like for cooling the heater board.

In the recording head described above, the electrothermal transducer elements and other function elements in association therewith are disposed at high density, and therefore, the heat generated at matrix wiring portion and the diode portion is accumulated or transferred.

Figure 17:
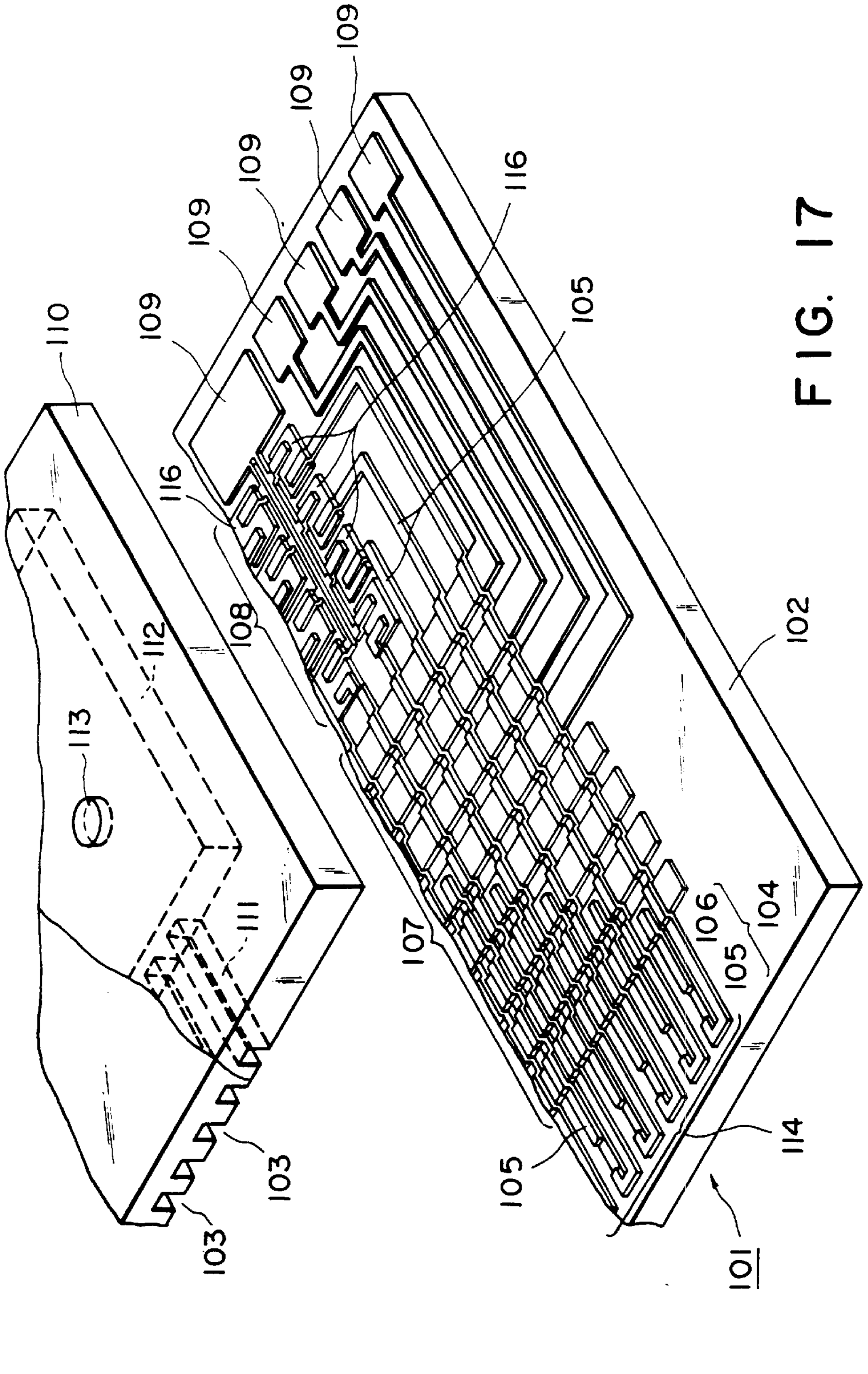
FIG. 17 is a perspective view of the recording head according to a further embodiment of the present inventions
Figure 22:
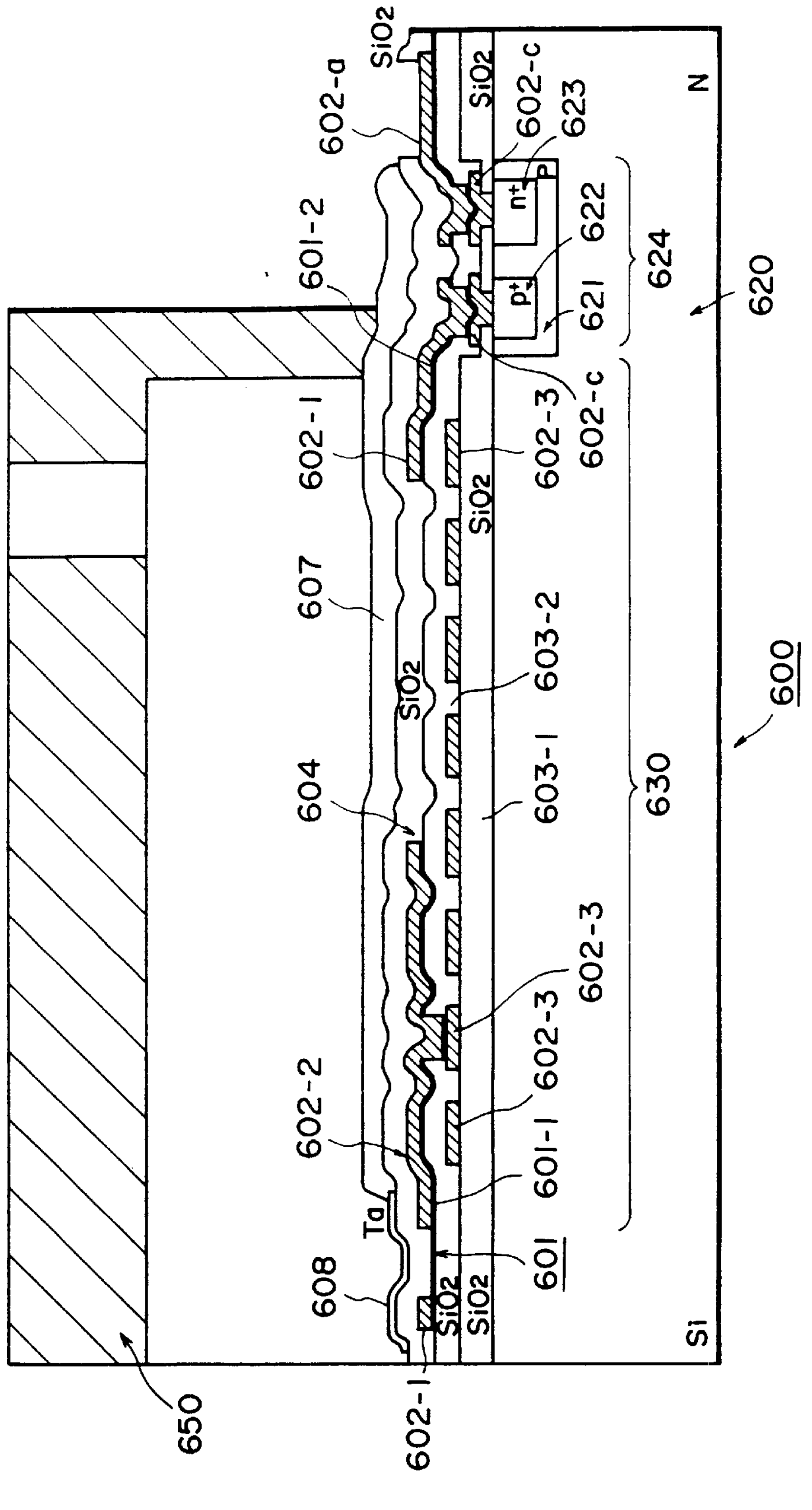
FIG. 22 is a sectional view of the substrate illustrating a further improved layer structure.

Referring to FIGS. 17 and 22, there is shown an embodiment which advantageously utilizes this heat to preliminarily heat the liquid. According to this embodiment, the area wherein the electrothermal transducer elements are disposed and the area wherein the function elements are disposed are separated, and, the ink chamber is extended to cover the matrix wiring portion except the portion where the electrothermal transducers are disposed on the substrate and to cover at least a part of the portion where the function elements are disposed, by which the influence of the heat produced by the electrothermal transducer to the function elements is eased.

On the substrate, the electrothermal transducer elements, wiring and function elements are disposed in the order named from one end, and the common ink chamber (common to the respective ejecting nozzles) extends beyond the electrothermal transducer elements. Further preferably, the common chamber is extended immediately before the region where the function elements are disposed. With this structure, the influence to the function elements by a part of heat produced by the electrothermal transducer is reduced, and the heat accumulation in a recording head by the heat is reduced by the heat absorption by the ink and the heat discharge by the ejection of the ink.

Figure 18:
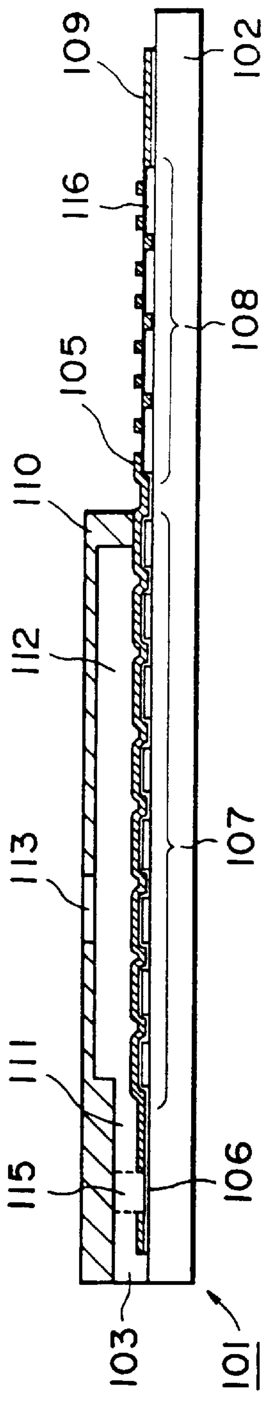
FIGS. 18, 19A and 19B are sectional views of the recording head shown in FIG. 17.

Referring to FIGS. 17 and 18, there is shown an exploded perspective view and a longitudinal cross section of the recording head according to this embodiment. The heater board generally designated by a reference 101 is provided with an unshown temperature keeping heaters and temperature detecting sensors described in the foregoing. It comprises a substrate 102, ink ejecting outlet 103, electrothermal transducer elements for producing heat required for forming bubbles in the liquid therein, wiring electrode 105, heat generating resistors 106, matrix wiring 107, driving circuit 108 containing plural function elements arranged in an array, electrode pads 109, a top board 110, ink passages 111, a common ink chamber for all ink passages and an ink supplying opening or openings 113.

As will be understood from this Figure, the recording head is constituted by connecting the heater board 101 and the top board 110. The heater board 101 is mainly constituted by the electrothermal transducer arranged portion 114 wherein a plurality of the electrothermal transducer elements 104 are arranged in an array, a driving circuit portion 108 containing function elements provided for the respective electrothermal transducer elements 104 and a matrix wiring portion 107 wherein the wiring in the form of a matrix establishes connection between each of the electrothermal transducer elements 104 and a corresponding driving circuit 108. Those portions are formed on a substrate 102 made of silicon or the like. The top board 110 is provided with a corresponding number of grooves and a common recess communicating with all of the grooves having predetermined configurations and dimensions to provide ink passages 111 to supply the ink to the electrothermal transducer element arranged portion and a common ink chamber 112.

The grooves of the top board are formed at the same intervals as that of the electrothermal transducer element 104. By this, the heater board 101 and the top board 110 are connected such that the grooves are opposed to the respective electrothermal transducer element 104 and plural ink passages 111 having a heat acting portion 115 at a part thereof and a common ink chamber 112 to supply the ink to the ink passages 111, are formed. At the top of the top board 110, there is provided an ink supplying port for permitting ink supply to the common chamber 112.

The electrothermal transducer element 104 on the heater board 101 includes a common electrode which is common to the elements, an electrode 105 connected to a collector of the transistor functioning as the function element constituting a driving circuit 108, and a heat generating resistor 106 connected between the common electrode and the electrode 105 to apply heat to the ink. Further, there is provided an electrically insulative protection layer (not shown) over the entire surface area of the electrothermal transducer element arranged portion 114, and an anti-cavitation layer (not shown) thereon. In the driving circuit portion 108, there are transistors (functioning elements) arranged in the surface portion of the substrate 102.

In the above structure, the electrothermal transducer elements are selectively driven in accordance with the signal supplied to the function elements of the driving circuit portion 108 in accordance with recording data, and in response to the signals the ink is ejected.

On the heater board 101, there are arranged that ejection outlet 103, the electrothermal transducer element arranged portion 114, the matrix wiring portion 107, the driving circuit portion 108 and the electrode pads disposed in the order named from the ink ejecting side, whereby the structure is provided in which the electrothermal transducer elements and the driving circuit portion are separated. Due to this arrangement, the influence, to the function elements, of the heat produced by the electrothermal transducer element is reduced. The common chamber 112 is extended to the matrix wiring portion, and the ink in the chamber is effective to reduce the heat accumulation in the recording head, as will be described hereinafter.

As will be understood, the ink chamber is extended to the rear portion of the matrix wiring portion and to before the driving circuit portion, and therefore, the amount of the ink in the ink chamber is enough to provide heat discharging effect to such an extent that the heater accumulation of the heater board is not influential to each of the function elements, whereby the recording fed can be operated with good recording quality and with high reliability during a long term recording. In addition, it is advantageous that no additional means is required for reducing the heat accumulation, and therefore, the manufacturing cost of the recording head is not increased.

Figure 19A:
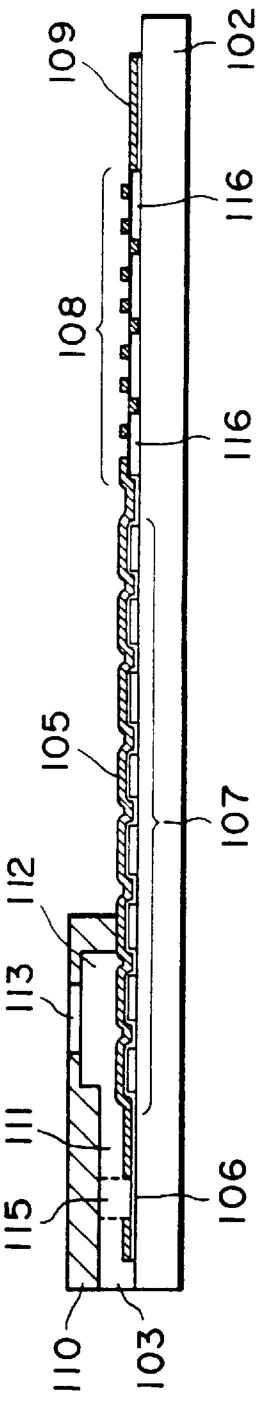
Figure 19B:
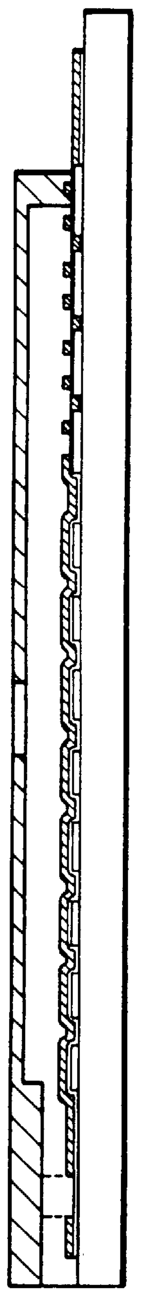

FIGS. 19A and 19B are sectional views for illustrating comparison of the heat accumulation reducing effect when the size of the ink chamber is different. In FIG. 19A, the ink chamber is smaller than the above described embodiment. In this structure, the reduction of the heat accumulation in the recording head due to the heat produced by the electrothermal transducer elements is sometimes insufficient when the recording is continued for a long period of time, with the result that the function elements are adversely affected by the heat and that the apparatus can be erroneously operated. For this reason, this arrangement is usable in a low speed recording apparatus or a low class recording apparatus.

In FIG. 19B, the ink chamber is further extended to cover the driving circuit portion. With this structure, the heat accumulation easing and heat discharging effects are sufficient. However, it should be noted that in the driving circuit portion, the wiring is complicated with high density, and the step coverage of the protection layer is difficult, and therefore, the defects of the protection layer more easily occur than the other portions. Therefore, FIG. 19B arrangement is possible without problem when the protection layer is very good. However, in the case of no protection layer or the protection layer with low cost, the care should be paid against the possibility of the short circuit between electrodes through the ink. From the foregoing, the most preferable extension of the liquid chamber is as shown in FIG. 18.

In the foregoing description of the embodiment, the function element constituting the driver circuit portion has been described as being a transistor having a switching function. However, the present embodiment is applicable to the case where the function element is a diode array equipped with the signal amplifying means, produced by known method.

Figure 20:
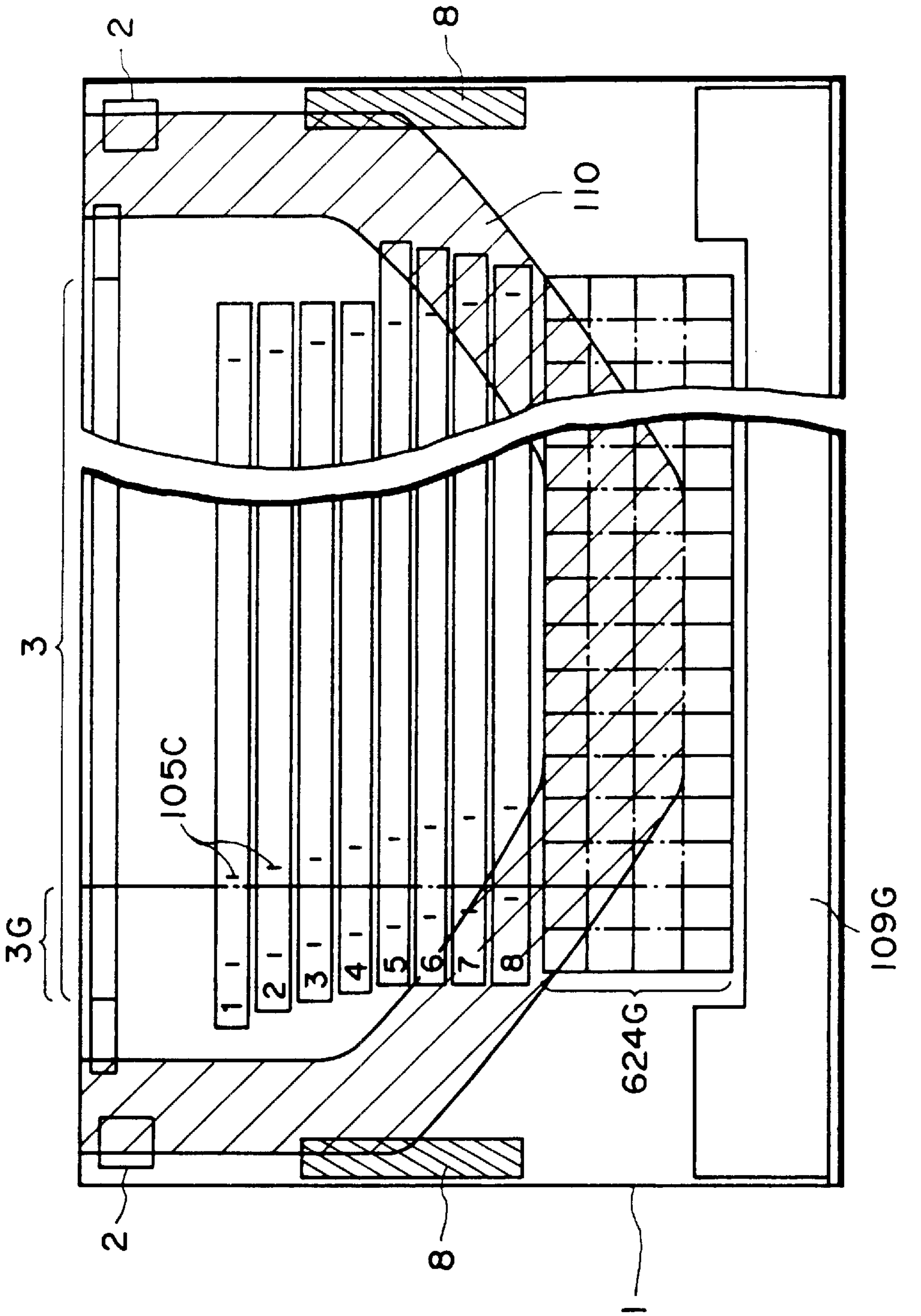
FIG. 20 is a somewhat schematic plan view of a substrate according to a further embodiment of the present invention.

FIG. 20 shows an embodiment wherein the arrangement is determined in consideration of the temperature and thermal conditions of the recording head. In this embodiment, a diode sensor is used in place of the temperature sensor 2 of FIG. 9A. A hatched area 110 is the area where the common chamber is contacted to the substrate 1, more particularly, it corresponds to a cross section of a vertical (perpendicular to the heat of drawing) wall of the common chamber. One group 3G of liquid ejecting thermal energy generating elements is constituted by eight electrothermal transducer 2 in this embodiment, and eight groups thereof are disposed at the ejecting heater region 3, so that 64 electrothermal transducer elements are used in this embodiment. A driver diode circuit portion 624G is provided for the purpose of time shearing drive of the 64 electrothermal transducers, in which one diode correspond to one of the electrothermal transducers. The wiring is not shown in this Figure, but it is similar to that shown in FIG. 17. In the Figure, eight horizontal electric lines are shown, which are horizontal part of the matrix wiring shown in FIG. 17. To the first line (1), the leftmost electrothermal transducers of 8 groups 3G are connected; to the second line, the second from the left transducers of the 8 groups 3G are connected; and the third to eight lines are connected in the similar manner. The contacts are partly shown in this Figure by reference 105*c*. In a region designated by reference 109G, a number of pads having a structure of one of those shown in FIGS. 16A, 16B, 16C, 16D and 17 are provided. Regarding the contact area 110, the inside of the vertical wall is so disposed to enclose the ejecting heater region 3. The contact area 110 is constituted by a parallel portion in the middle, which is parallel to the central 32 electrothermal transducers in the ejecting heater region 3, side portions extending toward the pad region 109, and inclined portions connecting the above two portions at an angle. Thus, the common chamber defined by the contact area 110 covers most of the matrix wiring portion 107. The rest of the wiring portion 107 is right below the contact area 110 (cross section of the vertical wall), and therefore, the heat produced by the entire wiring portion 107 is absorbed substantially by the common chamber and the liquid therein, so that the advantageous effects of FIG. 18 arrangement are provided.

The wall of the common chamber is generally made of synthetic resin material or glass ($SiO_2$), and therefore, the covering effect to the contact area 110 is improved. The vertical wall is bonded by applying bonding agent from the outside of the wall, and it has been confirmed that although a small amount of liquid entered the unavoidable gap between the bottom of the vertical wall and the top of the substrate, but no electric leakage occurred (the bonding agent applied from the outside of the vertical wall would not completely extend to the inside of the vertical wall), and substantially the same effects as with FIG. 18 arrangement were provided.

In FIG. 20, the diode temperature sensor in, the substrate heater 8 are built in the substrate 1, and therefore, correct temperature sensing and efficient heating are assured. In this embodiment, those element are partly overlapped with the contact area 110 between the common chamber and the substrate, but as a whole, they are outside the common chamber. That is, the liquid does not exist above those elements, so that those elements act mainly on the substrate 1. It is added that if at least one of the temperature sensor and the substrate heater satisfy this positional relation, the corresponding advantageous effects are provided.

Figure 21:
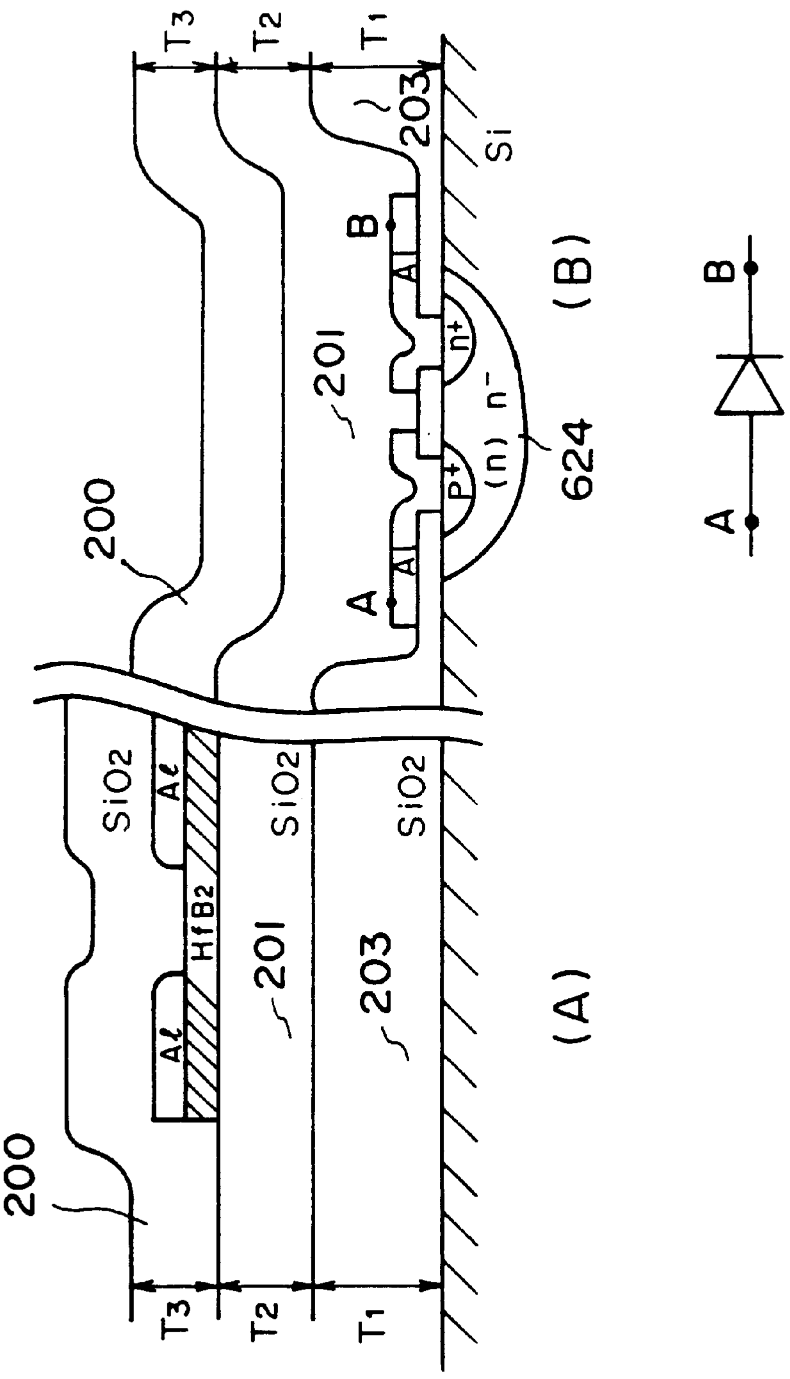
FIG. 21 is a sectional view illustrating a structure of the layers of a part of the recording head of FIG. 20.

Referring to FIG. 21, the sensor 2 and the heater 8 are within the laminated structure of the substrate, and therefore, they are covered by their upper and lower heat insulating layers, whereby the temperature sensing and the heating actions are not disturbed.

Referring back to FIG. 20, the common chamber has a configuration such that the quantity of the liquid corresponding to the central electrothermal transducers and to the matrix wiring portion is larger than that at the both sides, and therefore, the heat transfer from the central portion can be improved. At the side portions, on the other hand, the quantity of the liquid is relatively small (the distance from the transducer element and the inside of the vertical wall of the common chamber is relatively small), the temperature rising rate by the heater 8 is improved. Therefore, this arrangement is particularly effective when used with the heater control which will be described in conjunction with FIGS. 28–40. The number of the electrothermal transducer elements in one group and the number of groups may be increased as will be understood from FIG. 20.

Referring again to FIG. 21, the left part (A) thereof shows the laminated structure in detail of the electrothermal transducers (effective to form a bubble by film boiling) of the ejecting heater region 3 and the substrate heater 8 for heating the substrate 1, and the right portion (B) shows the laminated structure of the diode sensor 2 of FIG. 20 and one of the diodes in the driver diode circuit portion 624G. As will be understood from this Figure, the substrate 1 has three layers, namely a first insulating layer 203, a second insulating layer 201 and a third insulating layer 200 made of electrically insulating material such as $SiO_2$ on an Si material film layer functioning as the base. The thicknesses of those layers $T_1$, $T_2$ and $T_3$ satisfy $T_1>T_2>T_3$, and the total of the thicknesses is 2.0–4.5 microns. In the region A, the electric resistance layer $HfB_2$ is a resistance layer for the ejection heater 5 or the substrate heating heater 8. On the resistance layer $HfB_2$ a pair of aluminum electrodes Al is mounted to supply electric signals thereto. The pair of electrodes may be a layer below the resistance layer. In any case, the pair of electrodes Al and the resistance layer $HfB_2$ are sandwiched between the second insulating layer 201 and the third insulating layer 200, so that the heat generated there is transferred to both of the layers 200 and 201. As regards the ejection heater 5, the thermal transfer to the lower layer 201 is determined to efficiently produce the film boiling in the liquid (ink) on the layer 200 by the thermal energy. In this embodiment, the heater 8 is disposed on the layer 201, the thermal energy is sufficiently supplied to the layer 201, by which the thermal distribution is stabilized in a desired manner. The heaters 5 and 8 can be produced in the same structure and through the same film deposition process at a desired position, thus assuring the above advantageous effects.

The structure of the diode shown in (B) part of FIG. 21 is common to the switching diode 624 connected to the ejection heater 5 and to an independent diode sensor 2. The diode is disposed under the second and third insulating layers 201 and 200 to utilize the Si base layer and a thinned portion (thickness is $T_4$ which is smaller than $T_1$) of the first insulating layer 203. Because of the insulating layers 201 and 200 above the sensor diode, it can detect the temperature of the Si base layer substantially without thermal influence by the ambient conditions. Therefore, the diode sensor is linearly responsive to even a slight temperature change.

When the temperature sensor is constituted by an electrode type temperature sensor described hereinbefore in conjunction with FIGS. 1B and FIG. 9B, the electrode Al in the part (A) constitutes the sensor on the second insulating layer, so that a correct detection is possible. In any case, the temperature sensor contains the entirety or part of the structure of the electrothermal transducers and switching diode or transistor already contained in the substrate, by which the excellent temperature detection is accomplished.

If the Al temperature sensor and the diode or transistor sensor are compared, the latter is advantageous in that it is closer to the Si base layer of the substrate, from the standpoint of manufacturing easiness and the control effect.

The temperature detection using the diode will be described. A diode involves a forward voltage drop $V_F$. Generally, the forward voltage drop $V_F$ is dependent upon temperature, and it changes with temperature. Utilizing the change, the temperature change can be detected.

The forward voltage drop $V_F$ is also dependent on the density of the current flowing through the diode. If the current is constant, the forward voltage drop of the diode 34 is only dependent on the temperature. That is, there is a following relation between the voltage drop $V_F$ and the temperature.

$$V_F=(KT/q)\ln(I_F/I_S) \tag{1}$$

Where K is number of waves, and q is electric charge, and those values are constant; and $I_S$ is a current constant provided by an area of the p–n junction, $I_F$ is a forward current, and T is an absolute temperature.

Therefore, the forward current $I_F$ of the diode is fixed, and forward voltage drop $V_F$ is a function only of the temperature T, that is:

$$V_F=cT \tag{2}$$

$$c=(K/q)\ln(I_F/I_S)$$

FIG. 22 shows a recording head which has the common chamber having the same structure as described in conjunction with FIGS. 17–20. On a base member 620 there are formed a heater portion 601 containing electrothermal transducer elements, matrix wiring portion 630 and diode portion 624 (function elements). The base member 620 in this embodiment is made of n-type silicon base. The base member 620 may be made of p-type silicon substrate or n-type silicon substrate on which p-type or n-type layer is formed by epitaxial growth, or p-type silicon substrate on which p-type or n-type layer is formed by the epitaxial growth.

In the base member 620, the region in which the heater portion 601, the matrix wiring portion 630 and the diode portion 624 are formed is desired to have high resistance in consideration of the durability to the driving voltage for the heater portion 601. If the region is formed by the epitaxial growth, the electric resistance (resistivity) can be changed by controlling the amount of impurities therein, for example.

The impurities are, for example, those material belonging to the third group of the periodic table, such as B or Ga, when p-type is desired; or those belonging to the fifth group of the periodic table such as P or As if n-type is desired. The content of the impurities is preferably $1\times10^{12}$–$1\times10^{16}$ $cm^{-3}$, further preferably $1\times10^{12}$–$1\times10^{15}$. The material of heat accumulation layer 603-1 and 602-2 below the heater 601 are properly selected from the materials exhibiting good heat accumulation and insulating properties. The examples of usable materials are oxide of silicon, titanium, vanadium, niobium, molybdenum, tantalum, tungsten, chromium, zirconium, hafnium, lanthanum, yttrium, manganese, aluminum, calcium, strontium, barium; high resistance nitride of silicon, aluminum, boron and tantalum. In addition to those inorganic materials, the organic materials such as epoxy resin material, silicon resin material, fluorine resin material, polyimide, polyethylene terephthalate or photosensitive resin material are usable. They are formed into a single or plural layers. Among them, silicon oxide ($SiO_2$, for example) or silicon nitride ($Si_3N_4$, for example) is preferable.

The heater 601 is of a patterned structure containing a heat generating resistance layer and a pair of electrodes, and is formed on the insulating layer. The number of the heat generating layers corresponds to the number of picture elements to be recorded, and for example, it is the same as the number of ejecting outlets (N×M; N and M are integers not less than 2).

The examples of the materials usable for the heat generating resistance layer are metal such as tantalum, nichrome, hafnium, lanthanum, zirconium, titanium, tungsten, aluminum, molybdenum, niobium, chromium or palladium, alloy of them or boride of them.

The matrix wiring portion 630 includes N common signal selecting lines 602-3 formed on the heat accumulation layer 603-1, a heat accumulation layer 603-2 formed on the N-common signal selecting lines 602-3 and functioning as an insulating layer between layers, NxM individual signal lines 602-1 and NxM individual signal selecting lines 602-2, formed on the insulating layer 603-2. It has a multi-layer wiring structure.

The individual signal selecting line 602-2 is connected to one of the electrodes of one of the electrothermal transducer elements, and is connected to one of the common signal selecting lines 602-3 through the contact hole formed in the heat accumulation layer 603-2. The individual signal line 602-1 is connected to the other electrode of the one of the electrothermal transducers, and is connected to an anode electrode of the diode portion through the contact hole formed in the heat accumulation layer 603-2.

By arranging the crossing lines in three dimension, the area occupied by the wiring can be reduced. The same number, as the number of the heaters 601 (N×M), of the diodes are formed on the base member 620. In this specification, an element is called "formed or produced on the base member or substrate" even when it is within the base member or substrate".

By such an arrangement, it is avoided that when one of M groups is selected, the electric current erroneously flows through the heater in the group not to be driven.

The diode of this embodiment includes a p-type high resistance region (p region) 621 having a low impurity content, a p-type low resistance region ($p^+$ region) 622 provided in the p region 621, in ohmic contact with the anode electrode 602-c and having a high content of impurity. Those regions constitute an anode region. The diode further comprises an n-type low resistance region ($n^+$ region) 623 provided in the p region 621, having a high impurity content and functioning as a cathode region. Those regions constitute a unit cell. The polarity of the diode is determined on the polarity of the signals applied to the heater 601, and it will suffice if it exhibits the rectifying property.

In the arrangement of FIG. 22, the matrix wiring portion 630 is disposed between the heater portion 601 and the diode portion 624 (function element portion), and therefore, the distance between the heater portion and the diode portion can be determined property to avoid influence of heat.

In the direction of the thickness of the substrate, the heat accumulation layer is utilized as the electrical insulating layer between the layers in the matrix wiring portion, and therefore, they can be produced through the same process, so that the entire layer structure is not complicated. In addition, since the metal wiring (conductive layer) exists between the layers from the heat generating region (the heat generating resistance layer) to the diode, the heat is properly and uniformly diffused, and therefore, the heat transfer characteristics are good. In addition, the low layer wiring of the matrix wiring portion is formed in the heat accumulation layer, so that the heat applying surface, that is, the surface constituting the ink passage is less stepped, that is, smoother, thus permitting easier designing of the passage. The efficient use of the area on the expensive monocrystal silicon substrate promotes reduction of the size of the recording head, simplification in structure and reduction of the manufacturing cost.

On the surface of the base member containing the heater portion, the matrix wiring portion and diode portion, are protection layer 604 is provided which has good electrical insulating property, and good thermal conductivity.

On the protection layer 604 adjacent the heater 601, an anti-cavitation layer 608 is provided. Similarly, above the matrix wiring portion and the diode portion, an upper layer 607 is provided.

The materials of the protection layer 604 and the upper layer 607 may be the same as those for the heat accumulation layer. By using different materials for the protection layer 604 than for the upper layer 607, the function separation is accomplished. Examples of the materials usable for the anti-cavitation 608, are metal such as Ti, Zr, Hf, Ta, V, Nb, Cr, Mo, W, Fe, Co, Ni, alloy of them, or carbide, boride, silicide or nitride of the metal.

Figure 23A:
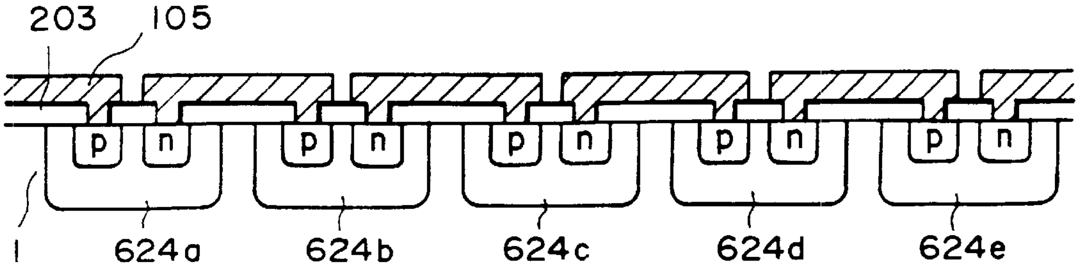
FIG. 23A is a sectional view of a modified temperature sensor, according to the present invention.
Figure 23B:
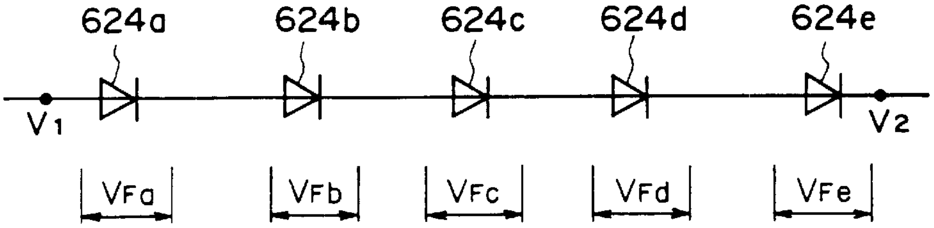
FIG. 23B shows an equivalent circuit of FIG. 23A structure.
Figure 24:
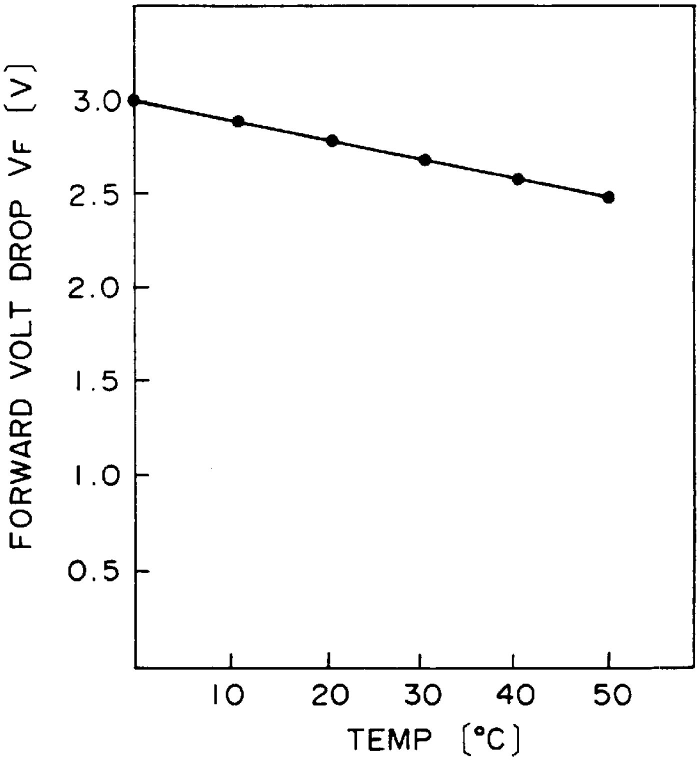
FIG. 24 is a graph of voltage drop vs. temperature of the temperature sensor shown in FIG. 23A.

Referring to FIGS. 23A, 23B and 24, another example of the temperature sensor 2 is shown wherein a plurality of the diodes are connected in series. In FIG. 23A, the temperature sensor comprises five of the diodes shown in FIG. 21. An aluminum electrodes are connected between the p region and n region of the diodes 624*a*–624*d* to establish series connection among the diodes, and to provide the contacts for the external lines. An insulating layer 203 is made of $SiO_2$ and is formed on the top of the recording head substrate 1 to effect electrical insulation among the electrodes. As will be understood, the five diodes 624*a*–624*d* are connected in series by the aluminum electrodes 105. FIG. 23B shows an equivalent circuit of FIG. 23A arrangement. As will be understood from this Figure, the total forward voltage drop $V_F$ is $V_1-V_2=V_{Fa}+V_{Fb}+V_{Fc}+V_{Fd}+V_{Fe}$, where $V_{Fa}$, $V_{Fb}$, $V_{Fc}$, $V_{Fd}$ and $V_e$ are forward voltage drops by the diode 3*a*, 3*b*, 3*c*, 3*d* and 3*e*, respectively.

FIG. 24 shows the results of measurement of the temperature change on the basis of the forward voltage drop $V_F$, when the above-described temperature sensor is incorporated in the recording head. As will be understood from this Figure, when the temperature of the recording head changes within the range between 0–-50° C., the voltage drop $V_F$ changes between 3.0–2.5 V, that is, the voltage change is as large as 0.5 V. Thus, the use of plural diodes connected in series provide larger voltage change.

Figure 25:
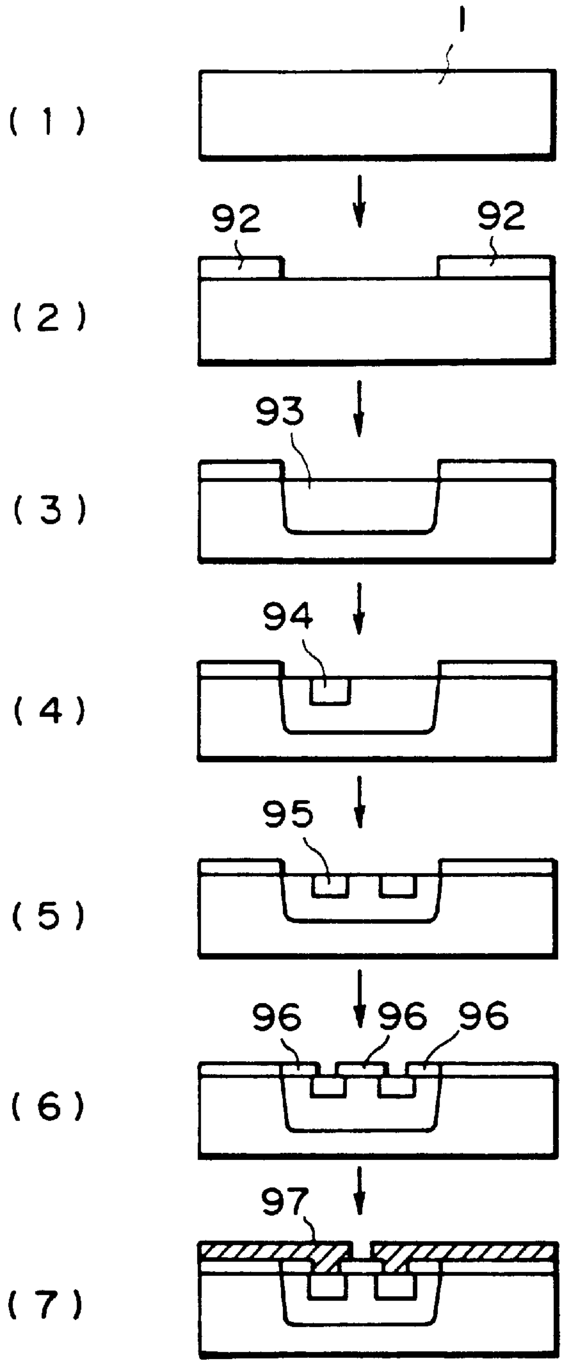
FIG. 25 shows steps of producing the diode sensor.

FIG. 25 shows the process steps for manufacturing the diode array shown in FIG. 23A on n-type silicon substrate, although only one diode is shown in this Figure. At step 2, an insulating layer 92 of $SiO_2$ is patterned on the n-type silicon substrate 23. In steps (3), (4) and (5), a p well diffused layer 93 is doped by use of a resist patterning technique, and $p^+$ layer 94 and $n^+$ layer 95 are doped in the p well layer 93. In step (6), an insulating layer 96 is patterned on the semiconductor thus produced. At the final step (7), the aluminum electrode wiring 105 is patterned.

In this example, five diodes are selected, but the number of the diodes is not limited. By connecting two or more diodes, the detection accuracy is improved, correspondingly.

Figure 26:
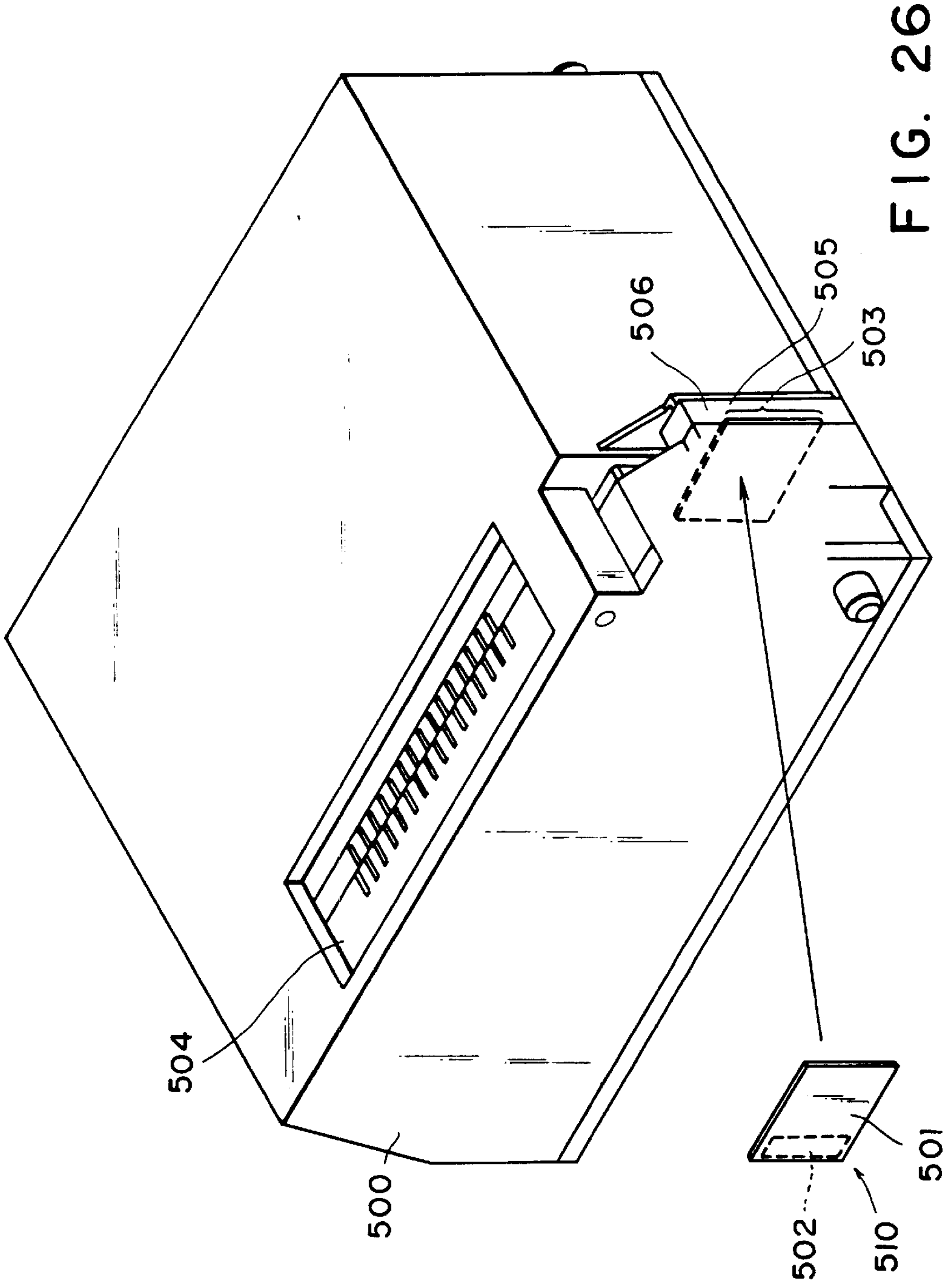
FIG. 26 is a perspective view of a recording head cartridge according to an embodiment of the present invention.

FIG. 26 is a perspective view of a cartridge type liquid jet recording head 500 containing as a unit a recording head and a ink container. In this embodiment, a substrate 501 (silicone base plate 501) having various elements 502 is integral with a top plate 502 for forming together with the substrate 510 liquid passages and a common chamber, into a unit. The unit is fixed in the cartridge, by which the pads of the substrate for the electric connection are connected with the corresponding pads of the cartridge. The cartridge is wired to the input contacts 504 formed in a recess of the cartridge. Reference numeral 505 designates the area where the thermal energy is applied by the electrothermal transducers; and 503 designates the group of the liquid outlets.

Figure 27:
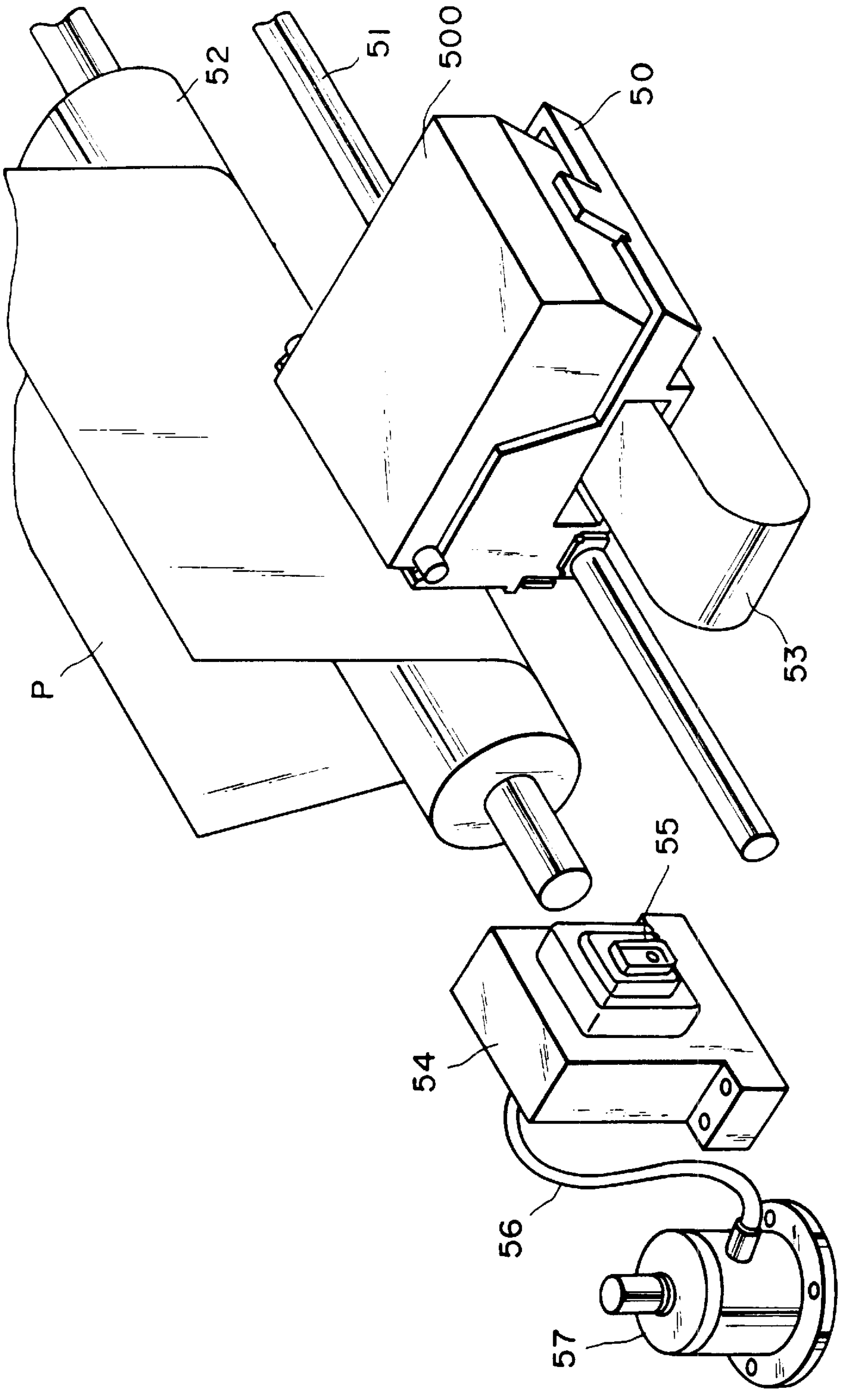
FIG. 27 is a perspective view of a major portion of a liquid jet recording apparatus using the cartridge of FIG. 26.

Referring to FIG. 27, the liquid jet recording head cartridge 500 of FIG. 26 is mounted in a recording or printing apparatus. The apparatus comprises, as shown in this Figure, a carriage 50, a carriage guiding rail 51, a flexible cable 53 for supplying electric signals and voltages from the main assembly of the recording apparatus, a capping device 54, a cap 55, a suction tube 56, a suction pump 57, a platen roller 52. Designated by P is recording paper. By the head cartridge 500 being mounted in place on the carriage 50, the mechanical positioning is established, and also the electric connection is established between the input contacts 504 and the corresponding contacts of the carriage 50. The carriage 50 is reciprocated by an unshown driving means along the rail 51.

The description will be made as to an example of a recovery operation in response to the detection described in conjunction with FIGS. 1A and 1B. The reference will be made to FIG. 27, too. The capping means 54 including the cap 55 automatically caps the liquid ejection outlet of the head cartridge by the cap 55 when the head cartridge 500 comes to a capping position by movement of the carriage 50. In this capping state, when the suction pump 57 is operated, the ink is sucked through the ejection outlets of the heat cartridge 500, and the sucked ink is flown to a sucking tube 56, whereby the function of the head cartridge is recovered or maintained.

The structure of the head cartridge is not limited to those having the ink container in this manner, but the recording head may simply be fixed to the carriage 702, and the ink is supplied from the ink container through an ink supply tube. Other modifications are possible within the sprit of the present invention.

The capping device functions to suck the ink, but this is not limiting, and may be of the other structure if it can maintain the function of the head and recovery thereof from ejection failure or improper ejection. The capping device is not necessary at the case may be. However, in order to assure the correct recording, the capping device is preferably employed.

Referring to FIGS. 28–40, another embodiment will be described in more detail with respect to the temperature sensing or the like, using the recording head 500 described above.

Figure 28:
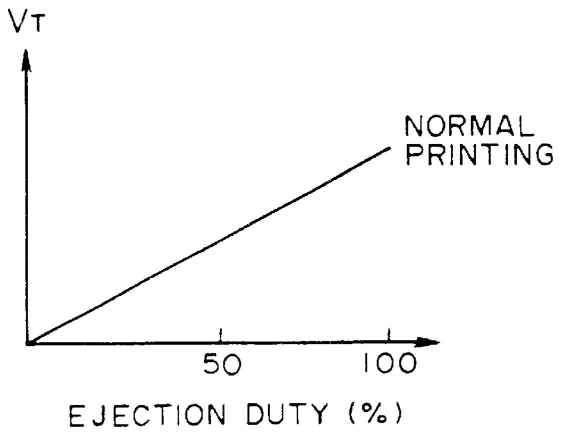
FIG. 28 is a graph of a voltage drop of the temperature sensor vs. ejection duty of the liquid jet recording head.
Figure 29:
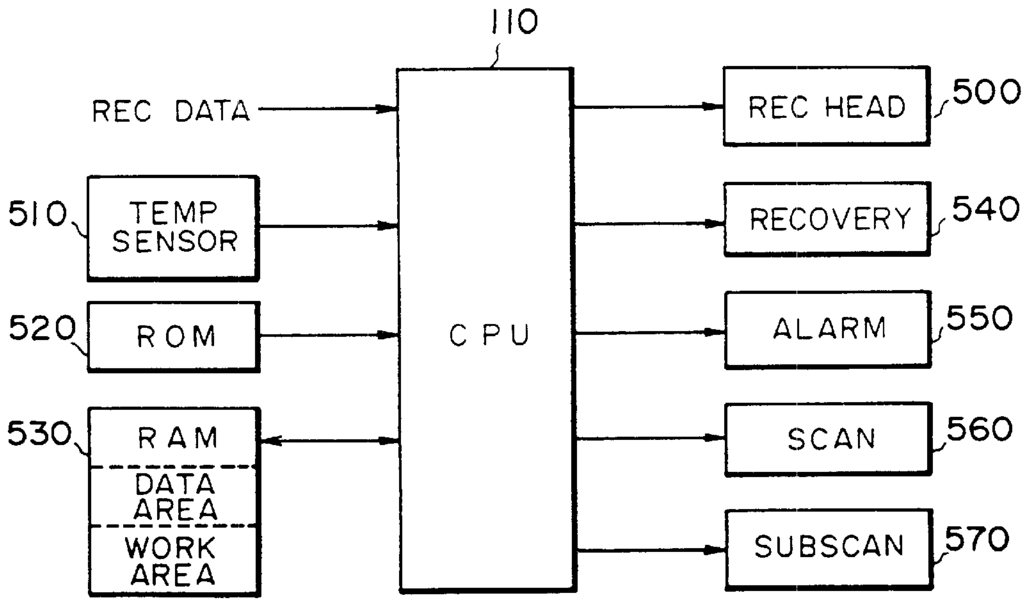
FIG. 29 is a block diagram of an example of a control system for recovery operation.
Figure 30A:
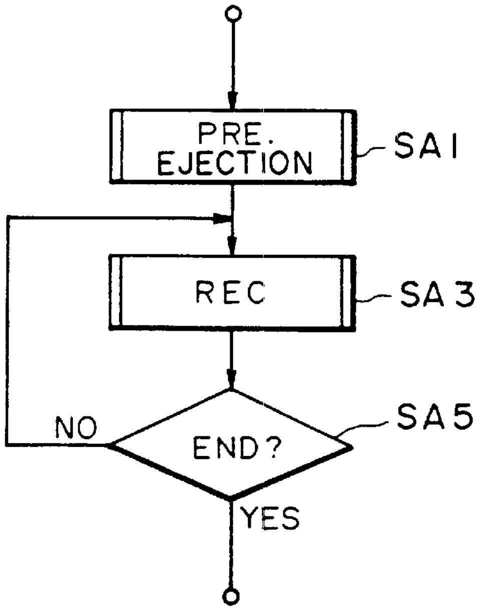
FIG. 30 is a flow chart illustrating examples of recording and recovery operations.
Figure 30B:
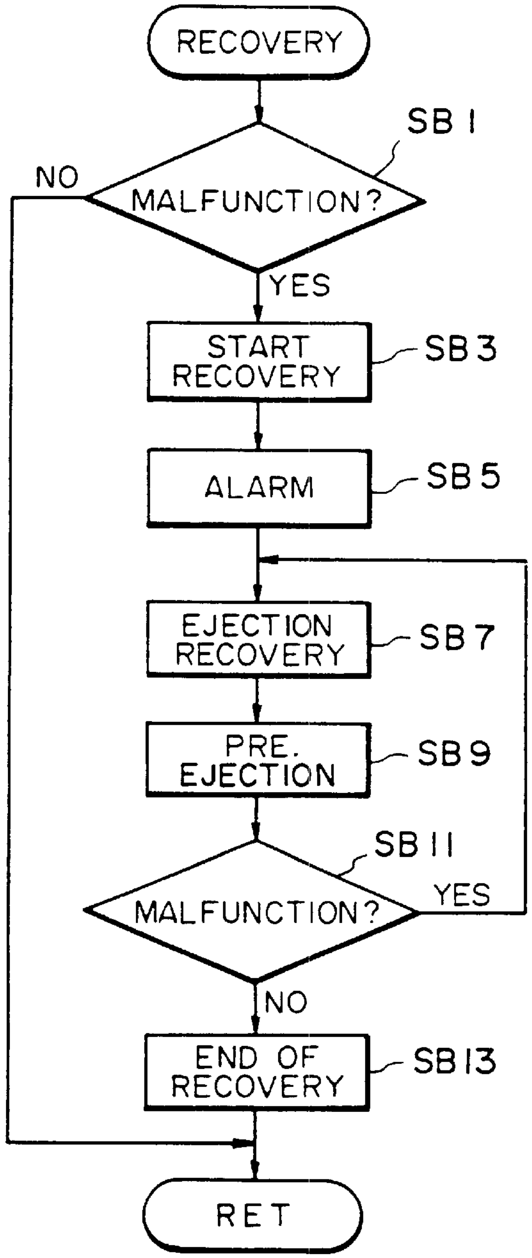

Referring first to FIGS. 28–30, the reference temperature To described in conjunction with FIGS. 3 and 5 is 60° C., and therefore, the reference voltage Vo is set to detect the temperature equal to or exceeding 60° C.

In the normal recording mode wherein the ink is ejected, there is a predetermined relationship between the ejection duty and the rate $V_T$ of the temperature change as shown in FIG. 28. In the normal recording, it is possible to determine an average duty for one line recording on the basis of the data contained in a line buffer storing the data for one line. If a proper table is stored in ROM or the like, the normal temperature change $V_T$ corresponding to the average duty can be determined. Then, the normal $V_T$ level and the output B (FIG. 5) are compared. When the latter is larger than 1.5 times the former (in consideration of the possible error), the malfunction is discriminated. In response to which, the emergency operation which will be described hereinafter will be started.

The CPU 110 is in the form of a microcomputer used also for the main control. A temperature state detecting portion 510 contains the temperature detecting circuit described in conjunction with FIGS. 3 and 5. In the structure of FIG. 3, the malfunction ditection signal is produced when T≧60° C. In the structure of FIG. 5, the temperature change rate data is produced. A ROM 520 stores a program for the process steps which will be described hereinafter referring to FIG. 30 and fixed data, such as the table representing the data of FIG. 28 when the temperature detector 510 is of the structure of FIG. 5. A RAM 530 includes a data area for storing one page data to be recorded or for arranging one line data and a work area usable for processing and control.

Designated by reference numeral 540 is an ejection recovery device and is normally placed outside the recording range. It may comprise the sucking mechanism of FIG. 27 or a pressure applying mechanism for applying pressure to the ink supply system of the recording head 500 to discharge the ink.

An alarm device 550 may include a display such as LED or a voice generating device such as a buzzer, or both. A main scanning mechanism 560 functions to scanningly move the carriage 50 during the recording. It includes a motor or the like. A subscanning mechanism 570 includes a motor 20 for conveying the recording medium P.

Referring to FIG. 30, the process steps of the operation of the apparatus of FIG. 29 will be described. In this Figure, the flow chart (A) is the general entire process chart, and the flow chart (B) is a flow chart for recovery processing usable from proper steps of the flow chart (A).

In the flow chart (A), when the recording instruction is produced, for example, a preliminary rejection step is performed in the recording head 500 in step SA1. During this step, the recording head 500 is capped by the capping device of the ejection recovery device 540, and the liquid or ink is ejected in the similar manner as in the recording to refresh the ink in the ink passage. Thereafter, the recording process (step SA3) in response to the data to be recorded is performed line by line while reciprocating the carriage 50. The recording process is repeated to the end of the recording (Step SA5).

The recovery process shown in the flow chart (B) can be executed during the preliminary ejection process (Step SA1) in the flow chart (A), immediately after the preliminary ejection step, during the one line recording (Step SA3), or immediately after the recording step.

When the recovery process is started, the discrimination is first made as to whether a malfunction occurred or not, at step SB1. The discrimination is made, for example, on the presence or absence of the signal from the comparator 9 when the structure of FIG. 3 is employed. When the structure of FIG. 5 is employed, the discrimination can be made on the basis of the temperature rising rate represented by the output of the A–D converter 32. When the recovery process is started in association with the preliminary ejection process, the table of the ROM 520 is accessed using the ejection duty at the time of preliminary ejection; and when the recovery process is started in association with the recording process, the table is accessed using the ejection duty average for one line. Then, the detected temperature rising speed is compared with the corresponding speed. If, no malfunction is discriminated, the process is terminated. If detected, the process steps SB3 and subsequent steps are executed.

At step SB3, various processes for executing the subsequent recovery operations are performed. For example, the recording head 500 is joined to the capping device; if the recovery process is started during the one line recording, the recording operation is interrupted. Next, at step SB5, the alarm 550 is actuated to inform of the malfunction to the operator. At step SB7, the ejection recovery process is executed to remove the cause or causes of the malfunction.

Thereafter, at step SB9, the preliminary ejection is performed, and the discrimination is made as to whether the malfunction is cleared or not during this preliminary ejection, at step SB11. If not, the steps SB7–SB11 are repeated. If so, the steps SB13 be executed for termination of the recovery process, for example, resuming the recording. Then, the recovery process is terminated.

By this recovery process, occurrence of a cause of the ejection failure or improper ejection can be correctly and quickly detected, so that the alarming and the recovery operation can be properly and quickly made.

In the foregoing example, the malfunction is detected in association with both of the preliminary ejection and recording ejection. However, it may be performed in association with only one of them. For example, the malfunction is detected every predetermined amount of recordings, or only in association with the preliminary ejection which is performed immediately before the start of the recording to perform the process of FIG. 30.

The recording head used in this embodiment has the structure shown in FIGS. 1A, 9A or 20 wherein the temperature sensors 2 are disposed at opposite ends of the substrate 1, and therefore, the temperature distribution of the substrate 1 along the direction of the array of the electrothermal transducer elements 5, from the outputs of the sensors 2. In addition, the temperature keeping heaters 8 are disposed adjacent to the temperature sensors 2, the sensors 2 are quickly responsive to the change of the temperature by the heating of the heater 8. Using those elements, the temperature distribution on the substrate is maintained constant in the following manner.

Figure 31:
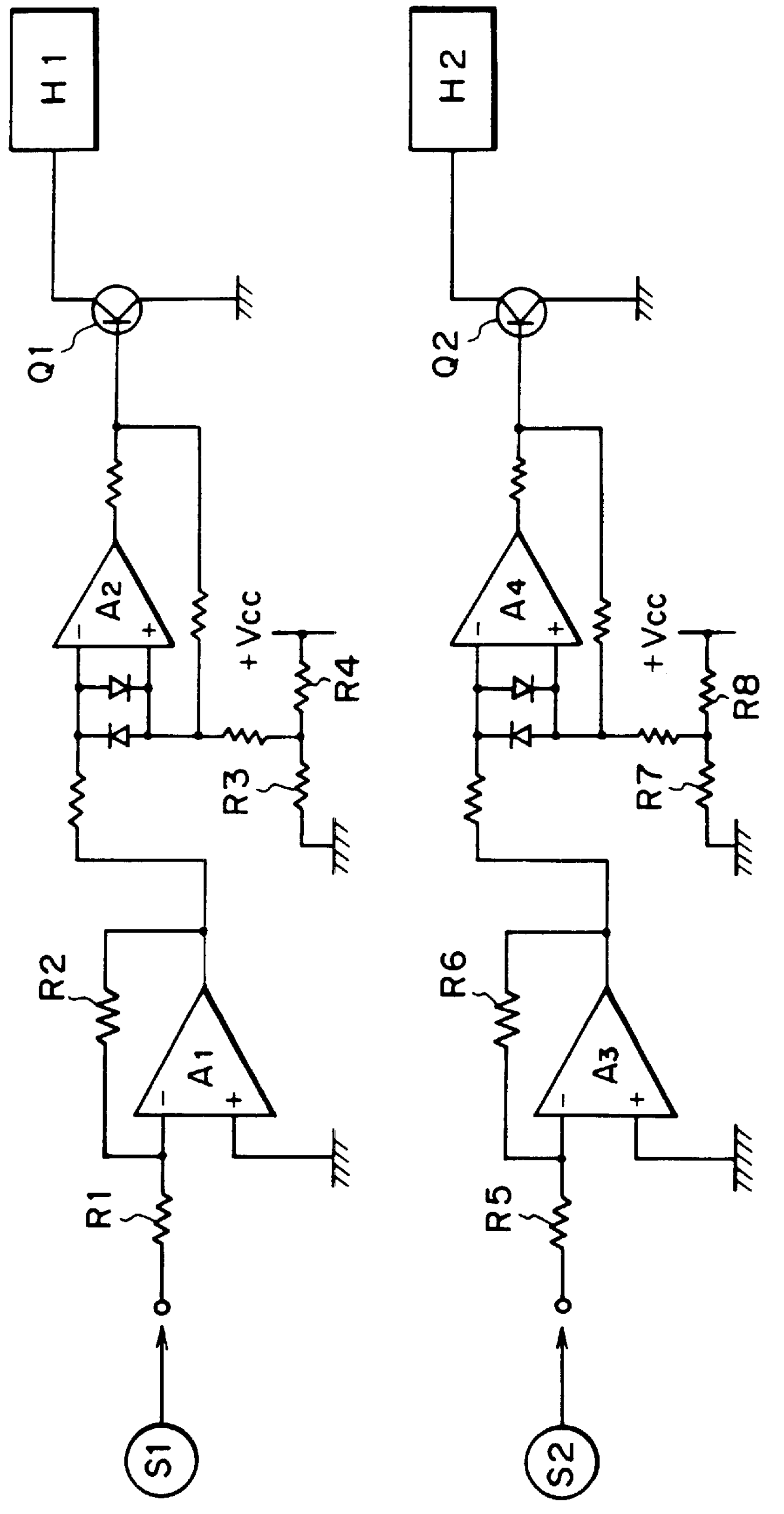
FIG. 31 shows an example of the temperature control system in the first embodiment of the present invention.

FIG. 31 shows an example of a circuit for executing the temperature control in this manner. In this Figure, references S1 and S2 designate temperature sensing portions which correspond to the two temperature sensors 2 on the substrate 1, respectively. Heating portions H1 and H2 correspond to the temperature keeping heaters 8 disposed adjacent to the respective temperature sensors 2. In the circuit shown in this Figure, the heating portions H1 and H2 may correspond to the temperature keeping heaters 8 plus several ejection heaters 5 adjacent to the opposite ends of the substrate when it is used for preliminary heating of the substrate. The circuit includes reversing amplifier circuits A1 and A2 connected to the output parts of the temperature sensors S1 and S2, comparators A2 and A4 for comparing the outputs of the circuit A1 and the circuit A3 with a reference voltage, and switching transistors Q1 and Q2 for energizing or deenergizing the heaters H1 and H2 in response to the outputs of the comparators A2 and A4.

An output of one S1 of the temperature sensors is amplified by the amplifier A1, and the comparator A2 energizes or deenergizes the heater H1 adjacent to the temperature sensor S1. Similarly, on the basis of the temperature detection by the other temperature sensor S2, the heater H2 is controlled.

Thus, in this structure, two temperatures are independently detected. When one temperature detected is higher than the reference temperature, the energy supply to the heater adjacent to the sensor is reduced to suppress the heating, and if the sensed temperature is lower than the or another reference temperature, the energy supply to the heater adjacent to the sensor is increased to raise the temperature. This temperature control may be executed for each of the sensors. By this control, the amount of heat generation by the temperature keeping heater (H1, H2) provided adjacent to the opposite ends of the substrate are independently controlled, so that the temperature of the entire substrate 1, particularly, the temperature adjacent to the ejection outlets can be maintained uniform.

Accordingly, this embodiment is advantageous in that the substrate heater 9 which may contain the part of the ejection heaters can be partially controlled and energized, the possible non-uniformness of the substrate attributable to an avoidable nature of the image to be recorded, more particularly, the non-uniform selection of the ejecting heaters 5 for the image formation, can be removed to provide the uniform temperature distribution. By this, the conditions influential to the liquid ejection can be uniform over the entire ejection heater array 3.

In FIG. 31, it is possible that the temperature at one side of the substrate 1 is deliberately made higher than that of the other side, in other words, temperature gradient is produced on purpose. This can be done depending on the nature of the image to be recorded, for example, the amount of ejected ink is larger at one side than the other. Or, it is effective when the frequency of use of the ejection heaters are not uniform.

In order to accomplish this, the magnitudes of amplification of the amplifiers A1 and A3 are made different. More particularly, $R_2/R_1$ is made not equal to $R_6/R_5$, with the threshold levels of the comparators A2 and A4 unchanged. Conversely, the threshold levels of the comparators A2 and A4 may be made different with the magnitude of amplification unchanged. Either can be accomplished by properly selecting the combinations of the resistances $R_3$ and $R_4$ and the resistances $R_7$ and $R_8$ are properly selected in FIG. 31.

In the foregoing embodiment, the recording operation is performed while controlling the temperature of the substrate 1 is controlled. When the ambient temperature is low, or when the uniform temperature distribution or a desired temperature gradient is not provided in a portion of the ejection heater portion 3 immediately after the actuation of the main switch of the recording apparatus, proper ones of the ejecting heaters 5 are energized with small energy not enough to eject the ink, thus heating the low temperature portion of the substrate 1 to correct the temperature distribution.

Figure 32:
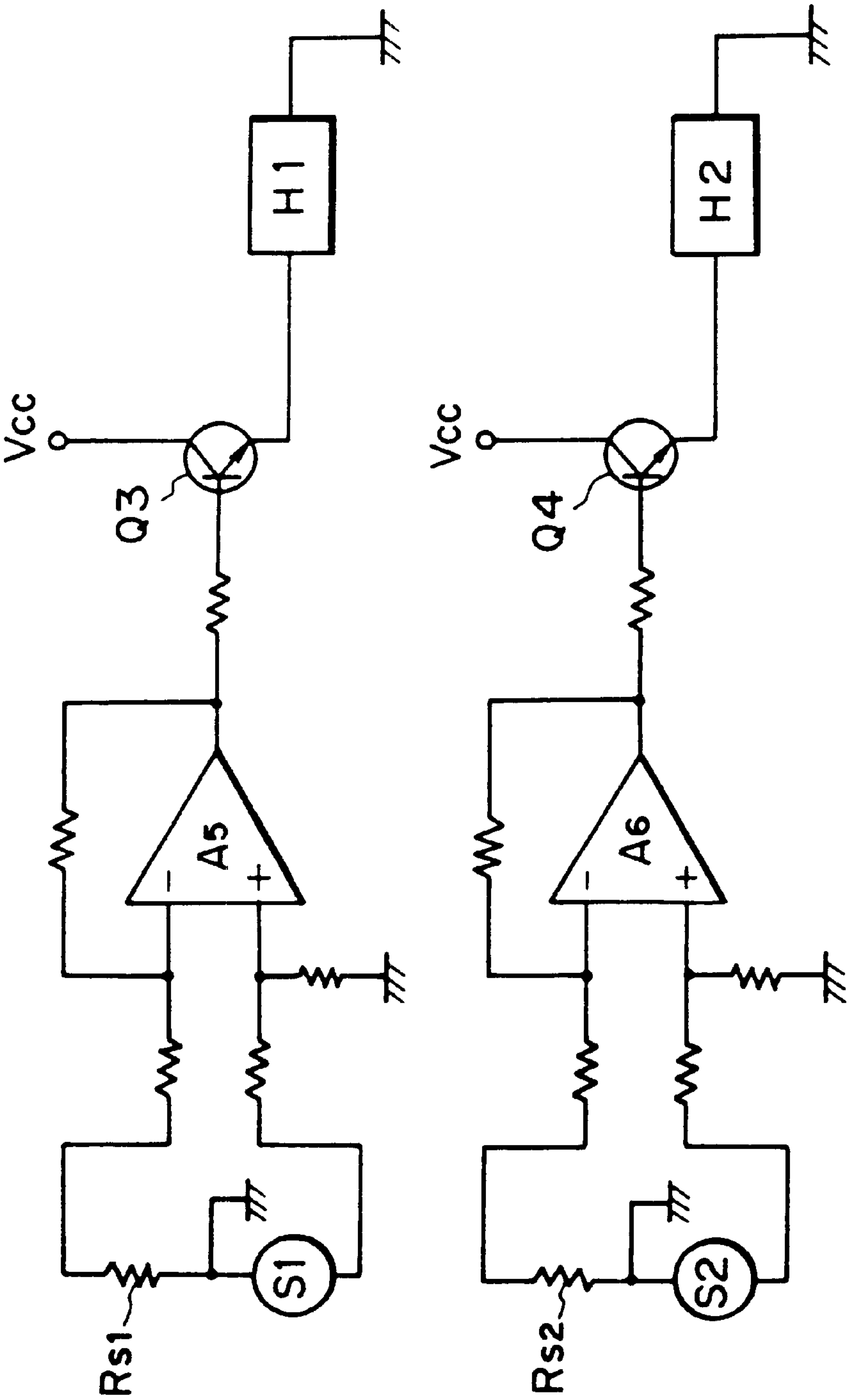
FIG. 32 shows a circuit of an example of the temperature control in the second embodiment.

FIG. 32 shows another example of the control circuit for the temperature control of the substrate 1. In this embodiment, each of the temperature sensors S1 and S2 is made of an NTC sensor such as an NTC thermister which exhibits negative temperature characteristics, and each of the heaters H1 and H2 are made of a PTC thermister which exhibits positive temperature characteristics. In the control circuit of this embodiment, fixed resistors $R_{S1}$ and $R_{S2}$ are connected to the temperature sensors or NTC sensors. A voltage is applied across them to provide divided voltages by the NTC sensor and fixed resistor, and they are introduced into differential amplifier A5 and A6 so that the difference in the divided voltages is amplified. The difference voltage is applied to basis of transistors Q3 and Q4 capable of accepting large current, by which the emitter currents of the thermisters are changed. By this, the power supply to the PTC heaters H1 and H2 is controlled. Since the resistance of the NTC sensor changes depending on the temperature, the resistances RS1 and RS2 are selected to be the same as the resistances of the sensors S1 and S2 corresponding to the target temperature levels at the position of the sensors S1 and S2. By this selection, when the temperature is different from the target to a large extent the output of the differential amplifier becomes large, so that the large current is supplied to the temperature keeping heater, that is, the PTC heater H1 and H2 in this embodiment. On the other hand, when the temperature is close to the target level, the output of the differential amplifier is small, in response to which the power supply to the PTC heater H1 or H2 is suppressed. When the temperature exceeds the target level, the polarity of the output of the differential amplifier A5 or A6 is reversed, whereupon the power supply control transistors Q3 or Q4 is not actuated, and therefore, the PTC heater H1 or H2 is not energized, by which the temperature into suppressed.

Since the heaters H1 and H2 are PTC heaters, the resistance of the PTC heater increases with increase of the temperature, and therefore, the current flowing through the PTC heater H1 or H2 becomes smaller with increase of the temperature, so that the above control is performed more efficiently.

In the circuit of FIG. 32, if the temperature sensors S1 and S2 are NTC sensors having the same characteristics, and if the resistances RS1 and RS2 are the same, the temperature distribution on the substrate 1 can be controlled to be uniform. If the resistances RS1 and RS3 are different, the temperature control is such that the temperature gradient is maintained on the substrate 1.

The above-described temperature control can be performed not only by the hardware shown in FIGS. 31, 32 and 33 but also by software, which will be described.

Figure 33:
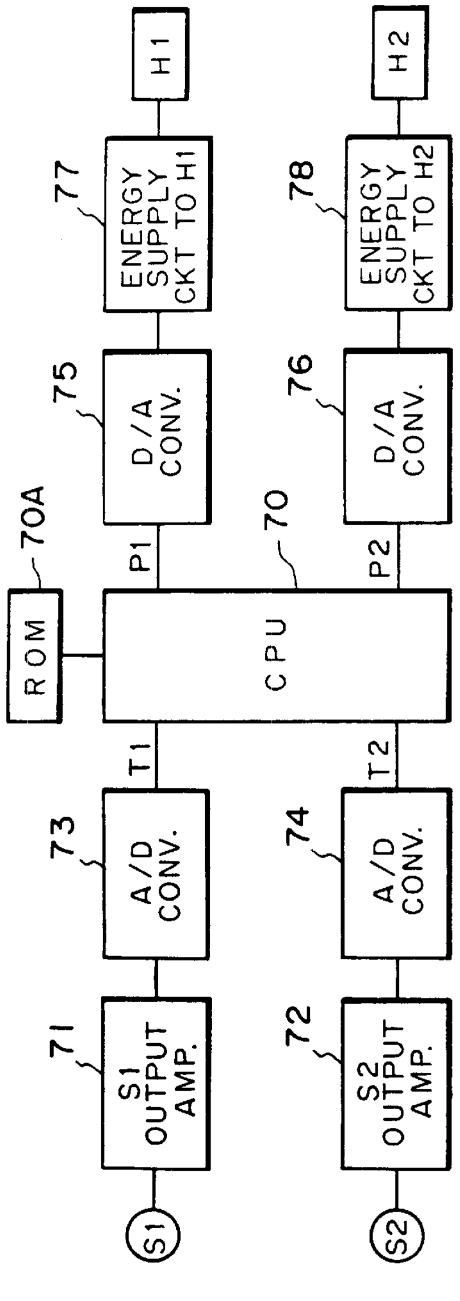
FIG. 33 is a block diagram illustrating an example of the temperature control system in the third embodiment.
Figure 34:
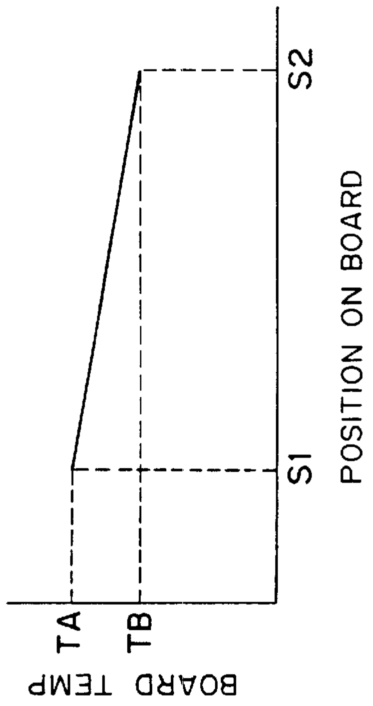
FIG. 34 is a graph showing a temperature distribution of the substrate which can be provided by the control system of FIG. 33.

FIG. 33 is a block diagram illustrating the software temperature control system. In the structure of this Figure, the outputs of the temperature sensors 2 (temperature sensing portions S1 and S2) on the substrate 1 are amplified by the amplifiers 71 and 72, respectively. Then, they are converted into digital levels T1 and T2 which can be accepted by the CPU 70 in the form of a microcomputer by A/D converters 73 and 74. The CPU 70 performs the temperature controls to provide the temperature distribution as shown in FIG. 34 for example, on the basis of the data of the digital temperature levels T1 and T2. The CPU 70 is connected with a ROM 70A storing a program for executing the process steps shown in FIG. 35. Using this program, the data of the heat generation by the heater H1 and H2 required for the control is calculated, and they are produced as digital data P1 and P2. The data P1 and P2 are converted to control signals for controlling the energy supply to the heaters H1 and H2, by D/A converters 75 and 76. A control signals are independently supplied to the heater H1 and to the heater H2 through the respective power supply circuit 77 and 78.

Further with respect to this structure, the description will be made as to the program for providing the temperature gradient on the heater board (substrate) of FIG. 34, referring to the flow chart of FIG. 35.

At step ST1, the discrimination is made as to whether or not to perform the temperature control. If the result is affirmative, the sequence goes to the step ST2. If not, the operation stops. At step ST2, the discrimination is made as to whether or not the detected temperature T1 at the position S1 is equal to the set temperature $T_A$ for the position S1. If it is equal, the energy supply to the temperature keeping heater is not necessary, and therefore, the operation advances to a step ST4 where the data T1 and T2 are reset to "0". Then, at step ST10, the discrimination is made as to whether or not to continue the temperature control. If so, the sequence goes back to the step ST2, if not, the process is terminated.

If, at step ST2, the temperature T1 is not equal to $T_A$, discrimination is made as to whether or not T1 is larger than $T_A$ at step ST3. If it is larger, it means that the substrate temperature is higher than the target level, and therefore, it is not necessary to energize the temperature keeping heater. Then, the step ST4 is executed. If, on the other hand, T1 is lower than $T_A$, it means that the substrate temperature is lower than the target, and therefore, the temperature keeping heater is energized to increase the temperature of the substrate. Then, the step ST5 is executed to determine the level of energy supply to the temperature keeping heater, at step ST5, on the basis of the difference between the data T1 (T2) detected by the temperature sensor S1 (S2) and the target level $T_A$ ($T_B$) at the position of the sensor S1 (S2), the amount of control T1 (T2) to the temperature keeping heater H1 (H2) are independently determined to provide the proportional control. Here, $m_1$ and $m_2$ are proportional bands for the control of the heaters H1 and H2, and T0 is the amount of control required for the minimum heat generation for the heaters H1 and H2.

Since at the step S5, the amounts of control for the heaters H1 and H2 are determined simply on the basis of the fact that the substrate temperature T1 is lower than the target level at the position of the sensor S1. However, the step ST6 and the subsequent steps are effective to determine the amount of controls P1 and P2 depending on the temperature differences T1 and T2, so that the control can be performed so as to keep the temperature gradient of the entire substrate.

At step ST6, the discrimination is made as to whether or not the difference between the T1 and T2 is equal to the difference between $T_A$ and $T_B$. If so, the amounts of controls T1 and T2 determined by the step ST5 are proper, and therefore the step ST10 is executed. If the discrimination at ST6 is negative, the step ST7 is executed to modify the amounts of control T1 and T2 so as to maintain the temperature gradient of the substrate.

At step ST7, the discrimination is made as to whether or not the detected temperature difference T1−T2 is smaller than the set temperature difference $T_A-T_B$ or not. If it is smaller, it means that the temperature T2 is slightly higher than the temperature T1, the amount of control T2 to the heater H2 is required to be reduced on the percentage of the difference. To do this, the step ST8 is executed to make this correction. Then, the step ST10 is performed. If, at step ST7, the temperature difference T1−T2 is larger than the temperature difference $T_A-T_B$, it means that the temperature T1 is slightly higher than the temperature T2, and therefore, the amount of control T1 is required to be reduced, correspondingly. Therefore, the step ST9 is executed for the correction, and then, the step ST10 is performed.

At step ST10, the discrimination is further made as to whether or not the series of calculations should be repeated or not. If so, the sequence goes back to the step ST2 to repeat the calculations. If the repetition is not to be made, the process is stopped here.

In the manner described above, the amounts of control T1 and T2 to the temperature keeping heaters H1 and H2 can be determined by the proportional control to provide the temperature distribution of the substrate as shown in FIG. 34 on the basis of the temperature detections T1 and T2 by the temperature sensors S1 and S2. In the process of FIG. 34, the control is such as to keep the temperature gradient at all times, and therefore, the temperature gradient is not reversed, and therefore, the control is very good and responsive.

Figure 36:
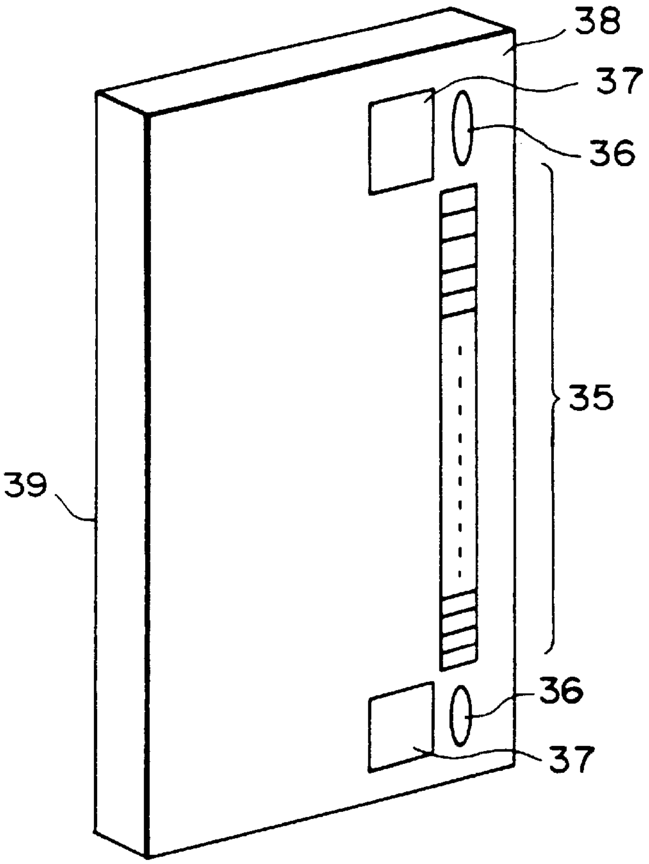
FIG. 36 is a perspective view of a recording head according to a further embodiment of the present invention.

FIG. 36 shows an example wherein the present invention is incorporated in a thermal head using an ink sheet. A thermal head 39 includes a substrate 38, heat generating elements 35, temperature keeping heaters 37 and NTC thermisters 36 (temperature detecting means). The same control process as described hereinbefore can be performed to the thermal head of this type.

Figure 37:
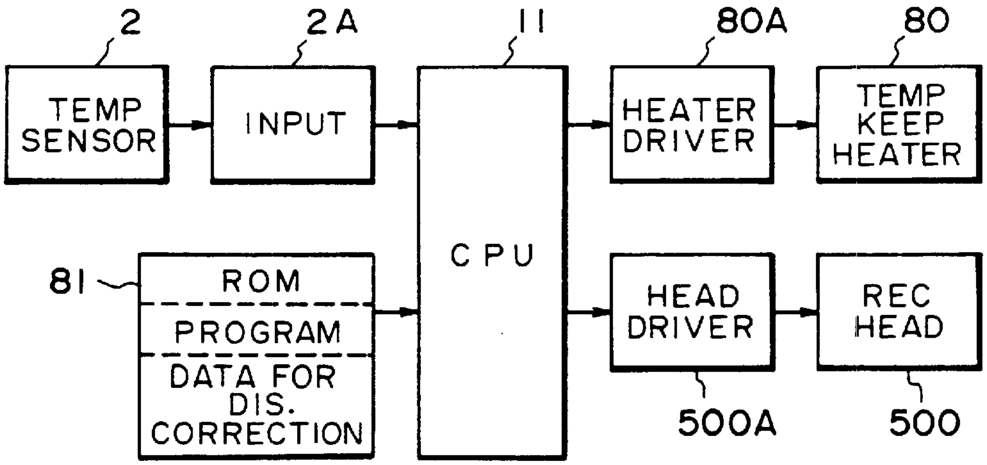
FIG. 37 is a block diagram of an example of a control system.
Figure 38:
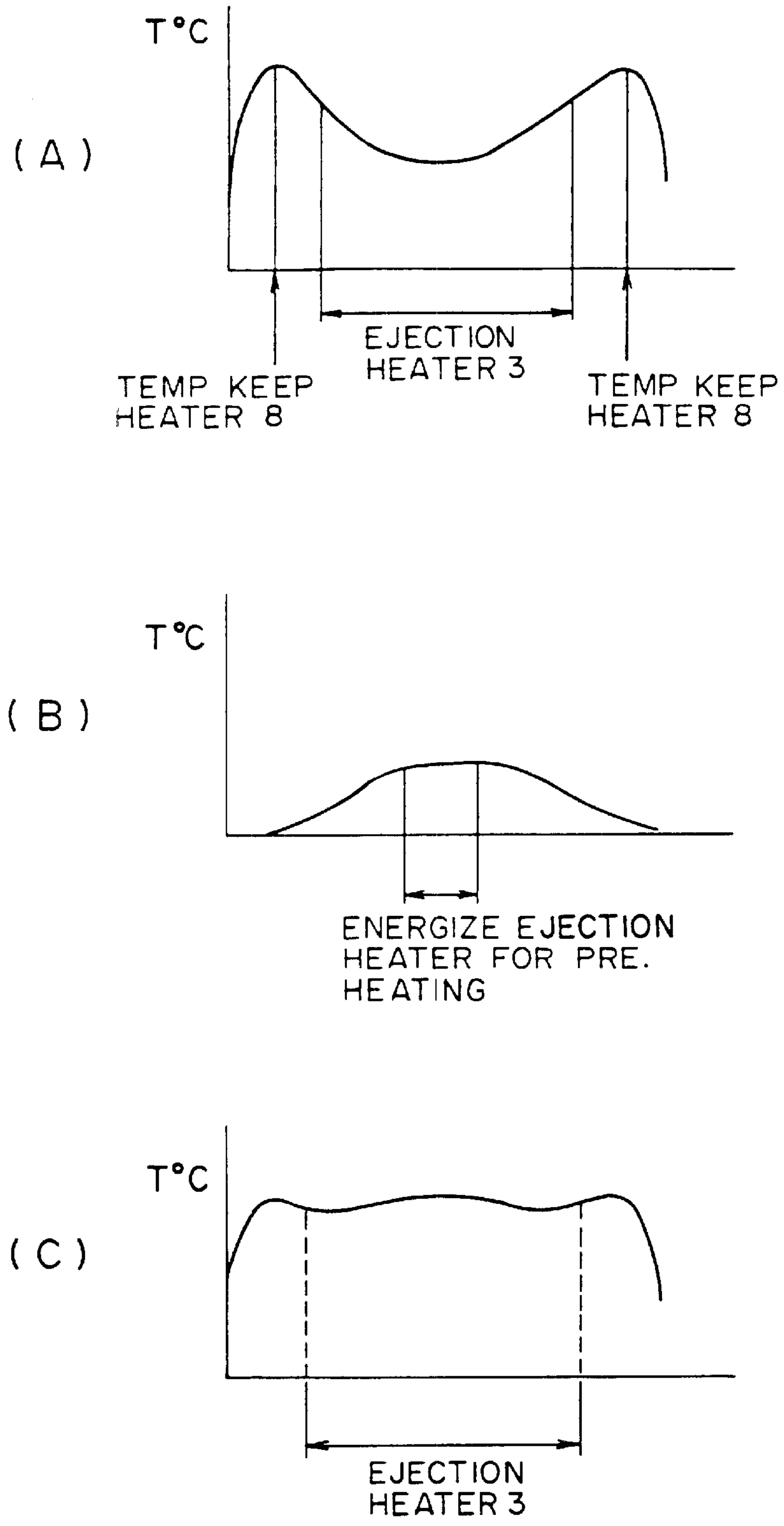
FIGS. 38A, 38B and 38C illustrate correction of the temperature distribution.

FIG. 37 shows an example of the control system when the temperature sensors 2 and the temperature keeping heaters 80 shown in FIG. 9 are used. The various parts shown as being connected to the sensors 2 and the heaters 80 in this Figure may be provided on a control board or the like of the main apparatus, and the electrical connection is established by the cable 16 using contacts 4.

In FIG. 37, a CPU 11 in the form of a microcomputer is provided to perform the process steps which will be described hereinafter. It also comprises a ROM or the like for storing fixed data such as a program for executing the process steps. The CPU 11 can be provided to execute to independently perform the temperature control of this example. Or, it may be used also for the main control of the apparatus of FIG. 36.

An input portion 2*a* of FIG. 37 is effective to read the detected temperature by actuating the temperature sensor 2 and to convert the detected temperature to a signal acceptable by the CPU 11. A heater driver 80A functions to supply energy to the temperature keeping heater 80. A driver 500A serves to drive the recording head 500.

The temperature control of this example will be described. Referring to FIG. 38A, there is shown a temperature distribution on the substrate 1 when only the temperature keeping heaters 2 are used. In the structure having the temperature keeping heaters at opposite sides, the temperature distribution is such that the temperature is lower in the middle portion of the substrate 1. Then, the properties of the ink (viscosity, surface tension or the like) at the low temperature can be different with the possible result of non-uniform amounts of ink ejection. It is possible that the resultant recorded image have non-uniform image density which is not preferable.

In view of this, in this embodiment, such energy as is not enough to form a bubble resulting in the ink ejection is applied by the ejection heater 5 to the nozzle corresponding to one or more of the nozzles where the temperature is low. By this, the substrate 1 is heated in this portion. This is called "preliminary heating". The energy control for this purpose can be made on the basis of the pulse width of the pulse energy applied to the rejection heater or heaters 5, the driving frequency and/or the driving voltage thereto.

The conditions of the preliminary heating are dependent on the configuration of the heaters 5, size or other parameters. When the substrate 1 is constructed in the manner shown in FIG. 9A, the energy conditions during the recording and during the preliminary heating are as disclosed in GB2,159,465A, GB2,169,855A, 2,169,856A or U.S. Pat. No. 4,112,172.

In this embodiment, the pulse width (Pw) of the pulse energy applied for the purpose of the preliminary heating is preferably equivalent to or smaller than that during the recording operation, more particularly, 1–1/20 thereof. The voltage applied (Vop) is similarly equivalent to or smaller than that during the recording. In this embodiment, Pw=2 micro-sec., Vop=24 V, and the driving frequency Fop=7 KHz.

As regards the selection of the ejection heaters to be operated for the purpose of the preliminary heating, it can be accomplished on the basis of the temperature distribution shown in FIG. 38A.

FIG. 38B shows the temperature distribution when the preliminary heating is performed using proper ejection heaters 5 containing the central portion heaters. By this, the temperature distribution is such that the temperature is higher in the middle portion, and lower at the marginal portions. Therefore, by combining the distribution when only the temperature keeping heaters 8 are used in FIG. 38A, the uniform temperature distribution as shown in FIG. 38C can be provided.

The number of ejecting heaters operated in the preliminary heating is determined on the basis of the temperature distribution provided when only the temperature keeping heaters 80 used. Such a temperature distribution may be measured beforehand, and on the basis of the temperature distribution, it may be stored in the ROM as fixed data, which is used when the temperature control is performed.

In order to provide the uniform temperature distribution, all of the ejecting heaters 5 contained in the properly determined area are driven under uniform preliminary heating conditions. It is a possible alternative that the driving conditions are made not uniform to provide a desired temperature distribution. Alternatively, only every other heaters may be driven.

Figure 39:
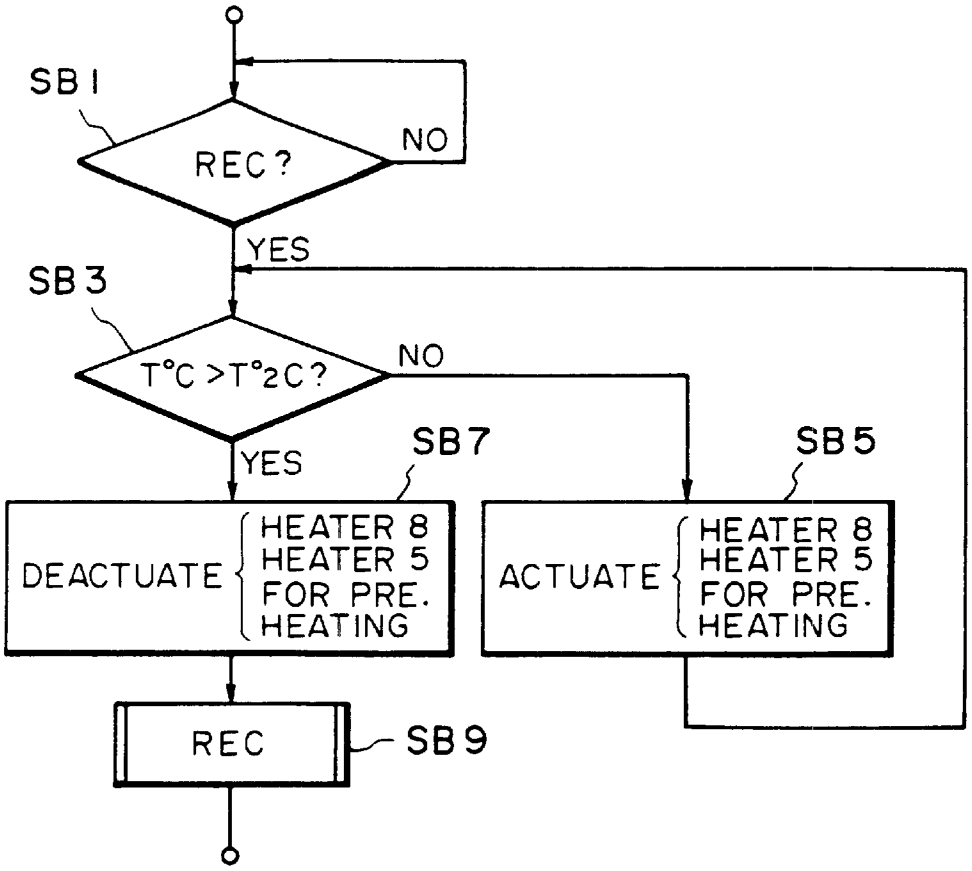
FIG. 39 is a flow chart of an example of the temperature control steps.
Figure 40:
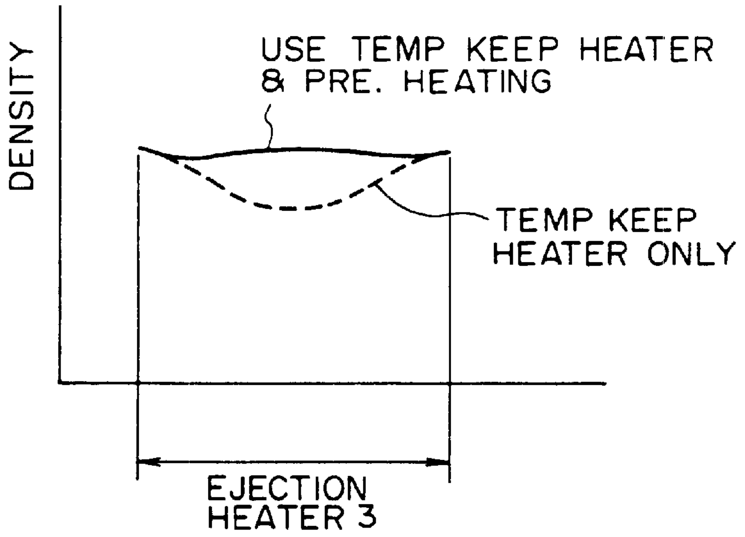
FIG. 40 is a graph illustrating advantageous effects of this embodiment.

FIG. 39 shows the process steps of the temperature control in this embodiment. It contains a partial flowchart immediately after the main switch is actuated and at the time of the start of the recording. At the time of the main switch actuated, various parts are initialized, and the temperature keeping heaters 80 are energized. Also, the selected ejecting heaters 5 are operated for the purpose of the preliminary heating under the conditions described above. Then, the discrimination is made as to whether or not the temperature T° C. exceeds a predetermined temperature T1° C. on the basis of the output of the temperature sensors 2. If so, the power supply to the temperature keeping heaters 8 and preliminary heating ejection heaters 5 is stopped. By performing this process steps, the temperature distribution of the substrate 1 becomes as shown in FIG. 38C.

In the process shown in FIG. 38B, the discrimination is first made as to whether or not the recording operation is to be performed, more particularly, whether or not the recording start signal is produced, at step SB1. If so, the discrimination is then made as to whether or not the substrate temperature T° C. exceeds the predetermined temperature T2° C., at step SB3. If not, the step SB5 is performed wherein the temperature keeping heater 80 and the preliminary heating ejection heaters 5 are energized, until the affirmative discrimination is made at step SB3.

When the discrimination at the step SB3 is affirmative, the step SB7 is executed where the temperature keeping heaters 80 and the preliminary heating ejection heater 5 are deactuated, and then, the recording operation is started using the ejection heaters 5 at step SB9. Through the above process steps, the ejection heater portion 3 of the substrate comes to have a uniform temperature distribution (FIG. 38C) over the entire array, so that the image density of the recorded image becomes uniform as indicated by a solid line in FIG. 40. When, on the other hand, only the temperature keeping heaters 8 are used, the temperature distribution is not uniform in the range (FIG. 38A), the image density is not uniform as indicated by a broken line in FIG. 40.

In the foregoing process steps, the predetermined levels T1 and T2 may be equal or not equal. For example, the level T1 (FIG. 39) may be slightly lower than T2, and in FIG. 39, the level T2 may be set higher than the level T1 since the recording is immediately performed. Inversely, in order to allow immediate start of the recording even after a certain period of rest, the temperature T1 is set slightly higher, and in the process of FIG. 39, the temperature T2 may be equal to the lower limit of the temperature range capable of performing the recording operation. In place of the above steps, the heater board is controlled to keep the recordable temperature range even during the rest period.

In the foregoing descriptions, the recording head to which the present invention is applied has been such a head as is used with a serial printer, but the present invention is applicable to a so-called full-multi-type recording head usable with a line printer in which the ejection outlets are arranged over the entire recording width, with the same good advantages.

Figure 41:
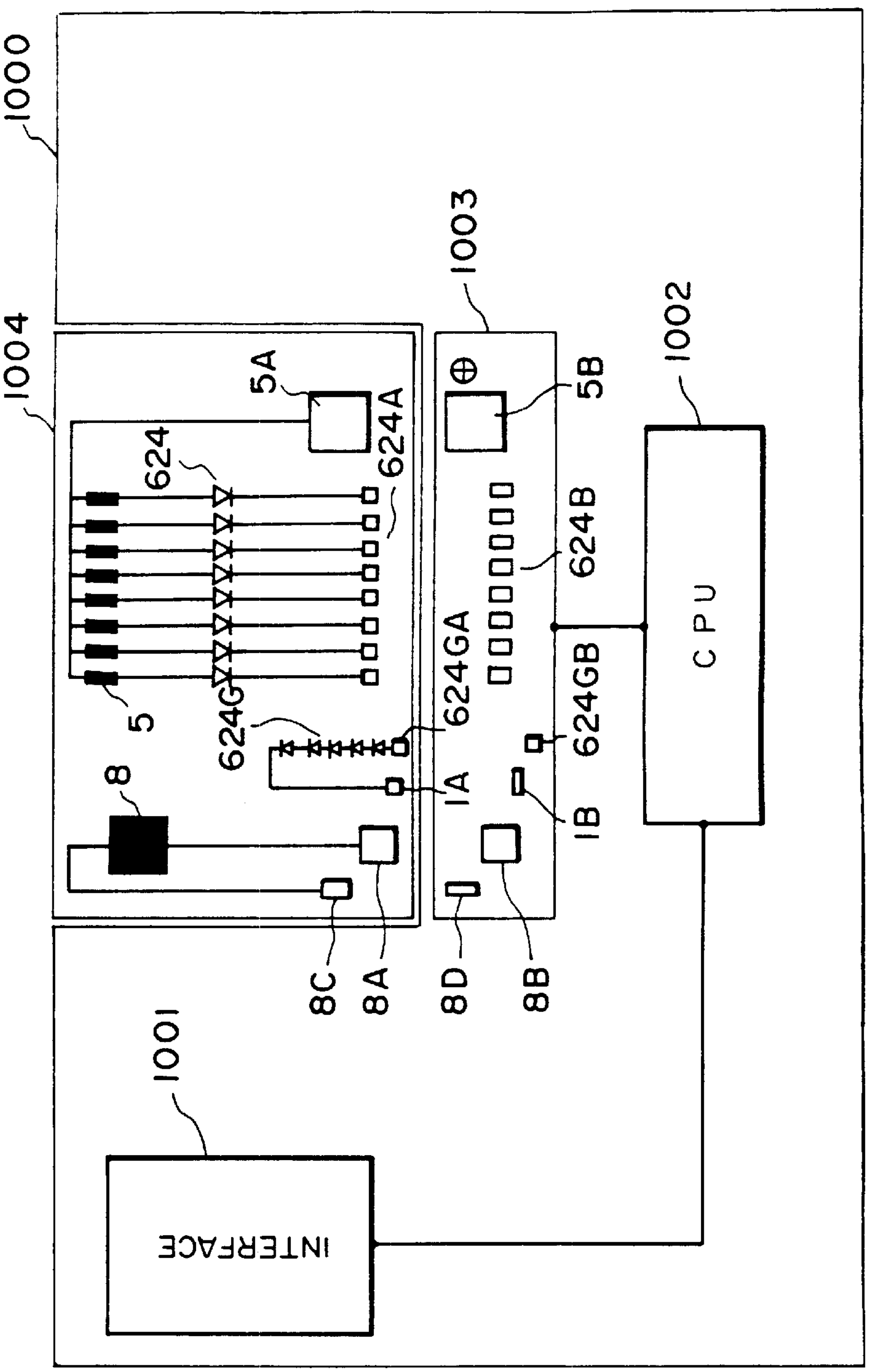
FIG. 41 schematically illustrates pads for electric connection between the cartridge and the main assembly of the liquid jet recording printer.

FIG. 41 shows schematically electric connections between an ink jet recording apparatus 100 and a substrate 1004 of a recording head cartridge.

Similarly to those described hereinbefore, the recording head cartridge substrate 1004 includes 64 ejection heaters 5 in the form of plural groups driven in a time shearing manner, but in this Figure, only 8 heaters 5 (one group) and a left side temperature keeping heater 8 and a left side temperature sensor 624G, only are shown. In this embodiment, the sensor 624G is in the form of the diode the same as the switching diode 624, as in FIGS. 20 and 21, and the ejection heaters 5 and the temperature keeping heaters 8 have the same film structure, as shown in FIGS. 20 and 21. In the embodiments described hereinbefore, in order to prevent the ejection heaters 5 from being always supplied with the voltage, a switching diode 624 is provided between the common electrode (pad 5*a* side) and the ejection heater 5. In this embodiment, however, the diode 624 is disposed between the selecting electrode and the ejection heater 5, although the former arrangement is practically preferable.

In the ink jet recording apparatus 100, the substrate 1004 is detachably mountable into the main assembly of the apparatus. In order to establish the necessary electrode connections between the main assembly and the substrate 1004 by the mounting of the substrate 1004, pads are formed in the region 1003 of the main assembly. In this embodiment, one of the electrodes of each of the same function elements has the same pad, and the other electrode thereof has another (different in the position and/or configuration) same pad. In addition, the pads are the same if the function elements are the same, and they are different if the function elements are different. All the pads are concentrated at one side of the substrate 1004. More particularly, the pad 5*a* for the common electrode of the ejection heaters 5 is maximum inside, and the pad 5*b* of the main assembly contactable thereto as the same size and configuration. It supplies positive potential. The pads 624A for the selecting electrodes of the ejection heaters 5 are small in size and arranged in a line, and the corresponding pads 624B of the main assembly is also small. A pair of pads 1A and 624GA for the voltage application to the diode sensor 624G are provided at different positions and at positions different from the pads 5*a* and 624A. In addition, the pads 8A and 8C for the voltage application to the temperature keeping heater 8 are different in the position and the size, and are disposed at positions different from those of the pads 5*a*, 624A, 1*a* and 624GA. By the distinction among the pad positions, the manufacturing of the head is easy, and the erroneous mounting of the cartridge can be prevented. The main assembly 100 includes an interface 1001 and a CPU 1002. In this embodiment, the main assembly 100 is the major part of the recording apparatus, but this embodiment is applicable when it is replaced with the cartridge of FIG. 26 having an integral ink container.

The recording head of the present invention may have the above-described structure wherein the flow passage is linear and the liquid is ejected in the direction from one edge of the heater to the other edge, in the structure where the liquid passage is bent at the position of the electrothermal transducer to eject the liquid in the direction perpendicular to the surface of the electrothermal transducer element, or the structure wherein the passage is bent at an angle not 90 degrees as disclosed in U.S. Pat. Nos. 4,558,333, 4,459,600. Also, the present invention is applicable to the structure disclosed in a Japanese Laid-Open Patent Application Publication 123670/1984 wherein a common slit is formed to provide the ejecting portions relative to the plural electrothermal transducers or to the structure disclosed in Japanese Laid-Open Patent Application 138461/1984 wherein the pressure wave produced by the thermal energy is absorbed by an opening provided for the ejecting outlet. The present invention is also applicable to the recording substrate, recording head or the recording apparatus for multi- or full-color recording apparatus wherein plural recording heads are used in combination or as a unit.

As described in the foregoing, one aspect of the present invention is in that the temperature sensors are disposed at both ends of the ejection heater element array, and/or that the sensor is the built-sensor in the substrate, so as to enable the correct temperature detection to be accomplished. In another aspect, the overall temperature distribution is improved by the use of the temperature keeping heater and/or the use of the recovery operation. In a further aspect, the thermal efficiency is improved with reduction of the size of the apparatus. Any combination of the features disclosed in this Specification which can be combined in accordance with the disclosure are contained in the state of the present invention.

While the invention has been described with reference to the structures disclosed herein, it is not confined to the details set forth and this application is intended to cover such modifications or changes as may come within the purposes of the improvements or the scope of the following claims.

What is claimed is:

1. A recording apparatus having a recording head, for effecting recording by ejecting liquid for recording through ejection outlets provided corresponding to heat generating elements provided in said recording head, using thermal energy generated by driving said heat generating elements, said recording apparatus comprising:

heating means for heating said recording head; and control means for selecting a predetermined heat generating element from among said heat generating elements to correct a temperature distribution of said recording head resulting from the heating by said heating means and for causing the selected heat generating element to generate heat to such an extent that liquid for recording is not ejected through the ejection outlet corresponding to the selected heat generating element.

2. An apparatus according to claim 1, wherein the temperature distribution is one resulting from actuation of said heating means, provided in said recording head, for heating said recording head.

3. An apparatus according to claim 1, further comprising means for detecting the temperature distribution of said recording head, wherein the predetermined heat generating element is actuated on the basis of an output of said temperature distribution detecting means.

4. An apparatus according to claim 1, wherein the temperature distribution to be corrected is a non-uniform temperature distribution.

5. A control method for a recording apparatus for effecting recording by ejecting liquid for recording through ejection outlets provided corresponding to heat generating elements provided in a recording head, using thermal energy generated by driving the heat generating elements, said method comprising:

a step of heating the recording head using heating means provided in the recording head; and a step of selecting a predetermined heat generating element from among the heat generating elements to correct a temperature distribution of the recording head resulting from the heating by the heating means and of causing the selected heat generating element to generate heat to such an extent that liquid for recording is not ejected through the ejection outlet corresponding to the selected heat generating element.

6. A method according to claim 5, wherein the temperature distribution is one resulting from actuation of the heating means, provided in the recording head, for heating the recording head.

7. A method according to claim 6, wherein the temperature distribution to be corrected is a non-uniform temperature distribution.

8. A recording apparatus comprising:

a plurality of temperature detecting means for detecting a temperature of a recording head including a group of heat generating elements for effecting recording using heat generated by electric energization;

a plurality of heating means, provided corresponding to the plurality of temperature detecting means, for heating the recording head; and control means, responsive to outputs of said temperature detecting means, for controlling thermal energies generated by said heating means corresponding to said temperature detecting means, respectively, independently of each other.

9. An apparatus according to claim 8, wherein said temperature detecting means and said heating means are formed integrally on a substrate of the recording head in which said group of heat generating elements are formed, and are interposed in an arranging range of said group of heat generating elements.

10. An apparatus according to claim 8 or 9, wherein the recording head is a liquid ejection recording head.

11. An apparatus according to claim 8 or 9, wherein the recording head is a thermal head.

12. An apparatus according to claim 8 or 9, wherein said plurality of temperature detecting means detects a temperature distribution inside the recording head.

13. An apparatus according to claim 8, wherein said temperature detecting means and said heating means are built-in in a substrate on which said heat generating elements are provided.

14. An apparatus according to claim 8, wherein wiring connected to said temperature detecting means and wiring connected to said heating means correspondent to said temperature detecting means are common wiring.

15. An apparatus according to claim 14, wherein said common wiring is electrically grounded.

16. An apparatus according to claim 8, wherein the thermal energy control performed by said control means produces a temperature distribution inside the recording head.

17. An apparatus according to claim 9, wherein the thermal energy control performed by said control means suppresses a temperature distribution inside the recording head.

18. A control method for a recording apparatus including a plurality of temperature detecting means for detecting a temperature of a recording head which has a group of recording elements for effecting recording using heat generated by electric energization, and a plurality of heating means, provided corresponding to the plurality of temperature detecting means, for heating the recording head, said method comprising the steps of:

producing a detection result of the temperature of the recording head by the temperature detecting means; and controlling each of the heating means, independently of one another, on the basis of a detection result corresponding to the respective one of the heating means.

* * * * *

UNITED STATES PATENT AND TRADEMARK OFFICE

CERTIFICATE OF CORRECTION

PATENT NO. : 6,598,952 B2
DATED : July 29, 2003
INVENTOR(S) : Hiroyuki Ishinaga et al.

It is certified that error appears in the above-identified patent and that said Letters Patent is hereby corrected as shown below:

Title page,
Item [56], References Cited, FOREIGN PATENT DOCUMENTS,
"JP 63-134252 6/1989" should read -- JP 63-134252 6/1988 --.

Figure 35:
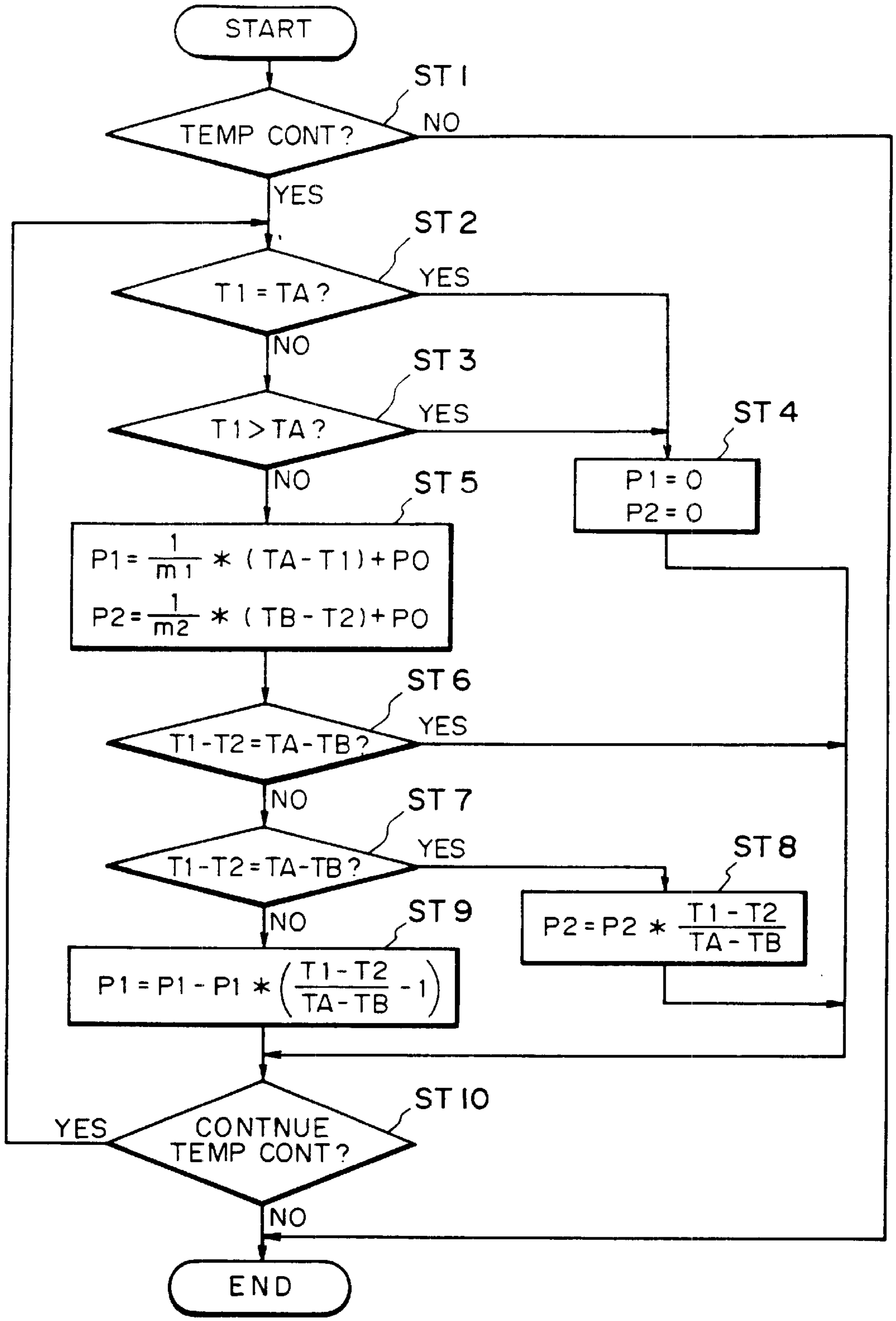
FIG. 35 is a flow chart illustrating an example of temperature control steps to provide the temperature distribution of FIG. 34.

Drawings,
Sheet 27, Fig. 35, "CONTNUE" should read -- CONTINUE --.

Column 1,
Line 55, "taken" should read -- taken into --; and
Line 66, "head." should read -- head is stable. --.

Column 2,
Line 25, "of an" should read -- of --.

Column 3,
Line 6, "element" should read -- elements --.

Column 4,
Line 18, "AND" should read -- and --.

Column 5,
Line 7, "inventions" should read -- invention. --.

Column 6,
Line 5, "transducers are" should read -- transducers) are --; and
Line 6, "disposed)." should read -- disposed. --.

Column 8,
Line 67, "those" should read -- these --.

Column 9,
Line 38, "contacted" should read -- contacted with --.

Column 11,
Line 42, "using a" should read -- using --;
Line 51, "sensor is by the" should read -- sensor by --; and
Line 56, "as has" should read -- as --.

Column 12,
Line 31, "the one" should read -- one --.

UNITED STATES PATENT AND TRADEMARK OFFICE
CERTIFICATE OF CORRECTION

PATENT NO. : 6,598,952 B2
DATED : July 29, 2003
INVENTOR(S) : Hiroyuki Ishinaga et al.

It is certified that error appears in the above-identified patent and that said Letters Patent is hereby corrected as shown below:

Column 13,
Line 29, "with different timing." should read -- at different times. --.

Column 15,
Line 25, "and to" should read -- and --.

Column 16,
Line 18, "correspond" should read -- corresponds --.

Column 17,
Line 66, "FIGS." should read -- FIG. --.

Column 19,
Line 43, "substrate"." should read -- substrate. --; and
Line 63, "property" should read -- properly --.

Column 20,
Line 15, "portion, are" should read -- portion, --;
Line 32, "21. An" should read -- 21. --;
Line 33, "aluminum" should read -- Aluminum --; and
Line 44, "$V_e$" should read -- $V_{Fe}$ --.

Column 21,
Line 3, "a ink" should read -- an ink --.

Column 22,
Line 12, "ditection" should read -- detection --.

Column 25,
Line 14, "transistors Q3 or Q4 is" should read -- transistor Q3 or Q4 is --;
Line 16, "into suppressed" should read -- is suppressed --; and
Line 51, "A control" should read -- Control --.

Column 27,
Line 40, "as is" should read -- is --.

UNITED STATES PATENT AND TRADEMARK OFFICE

CERTIFICATE OF CORRECTION

PATENT NO. : 6,598,952 B2
DATED : July 29, 2003
INVENTOR(S) : Hiroyuki Ishinaga et al.

It is certified that error appears in the above-identified patent and that said Letters Patent is hereby corrected as shown below:

Column 28,
Line 13, "used." should read -- are used. --;
Line 23, "heaters" should read -- heater --; and
Line 28, "actuated" should read -- actuation --.

Signed and Sealed this

Thirtieth Day of March, 2004

JON W. DUDAS
*Acting Director of the United States Patent and Trademark Office*